United States Patent
Hochi et al.

(10) Patent No.: US 12,241,910 B2
(45) Date of Patent: Mar. 4, 2025

(54) APPARATUS AND METHOD FOR CALIBRATING INERTIAL SENSOR

(71) Applicant: DENSO CORPORATION, Kariya (JP)

(72) Inventors: Suguru Hochi, Kariya (JP); Katsuhiko Muto, Kariya (JP); Yuya Higuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 300 days.

(21) Appl. No.: 17/465,211

(22) Filed: Sep. 2, 2021

(65) Prior Publication Data
US 2022/0074967 A1    Mar. 10, 2022

(30) Foreign Application Priority Data
Sep. 4, 2020    (JP) .................................. 2020-148868

(51) Int. Cl.
*G01P 21/00*    (2006.01)
*G01C 25/00*    (2006.01)
(Continued)

(52) U.S. Cl.
CPC ............ *G01P 21/00* (2013.01); *G01C 25/005* (2013.01); *G01S 19/14* (2013.01); *G01S 19/40* (2013.01); *G01S 19/52* (2013.01); *G01S 19/53* (2013.01)

(58) Field of Classification Search
CPC ....... G01P 21/00; G01C 25/005; G01S 19/14; G01S 19/40; G01S 19/52; G01S 19/53
See application file for complete search history.

(56) References Cited

U.S. PATENT DOCUMENTS 5,912,635 A * 6/1999 Oshizawa ............... G01C 25/00
                                                                     340/988
6,308,134 B1 * 10/2001 Croyle ................... G01C 21/16
                                                                     701/472

(Continued)

FOREIGN PATENT DOCUMENTS

EP        2367023 B1 * 1/2015 ............. B64D 45/04
JP      H09-154308 A    6/1997
(Continued)

OTHER PUBLICATIONS

"Gowda, M et. al.; Tracking Drone Orientation with Multiple GPS Receivers; Mobicom; 2016" (Year: 2016).*
(Continued)

*Primary Examiner* — Elaine Gort
*Assistant Examiner* — Christopher R Cardimino
(74) *Attorney, Agent, or Firm* — Maschoff Brennan

(57) ABSTRACT

In an apparatus for calibrating an inertial sensor configured to detect an angular velocity of a vehicle, an angular velocity estimator is configured to estimate a value for an angular velocity of the vehicle based on a value for an attitude of the vehicle and a value for a change in attitude of the vehicle estimated by the attitude estimator, and an error estimator is configured to estimate a value for an angular velocity error that is an error between the value for the angular velocity of the vehicle estimated by the angular velocity estimator and the value for the angular velocity of the vehicle detected by the inertial sensor. A calibrator is configured to calibrate the value for the angular velocity of the vehicle detected by the inertial sensor based on the value for the angular velocity error estimated by the error estimator.

18 Claims, 7 Drawing Sheets

(51) Int. Cl.
*G01S 19/14* (2010.01)
*G01S 19/40* (2010.01)
*G01S 19/52* (2010.01)
*G01S 19/53* (2010.01)

(56) References Cited

U.S. PATENT DOCUMENTS

| | | | | |
|---|---|---|---|---|
| 6,373,432 B1 * | 4/2002 | Rabinowitz | ......... | H04B 7/18552 |
| | | | | 342/357.29 |
| 6,421,003 B1 * | 7/2002 | Riley | ...................... | G01S 19/54 |
| | | | | 342/357.38 |
| 8,265,826 B2 * | 9/2012 | Feller | ................... | G05D 1/0278 |
| | | | | 701/472 |
| 8,583,315 B2 * | 11/2013 | Whitehead | ............ | G01S 5/0247 |
| | | | | 701/50 |
| 9,035,826 B2 * | 5/2015 | Ashjaee | .................. | G01S 19/14 |
| | | | | 342/357.27 |
| 9,157,216 B2 * | 10/2015 | Seki | ......... | G01S 19/23 |
| 2002/0067311 A1 * | 6/2002 | Wildey | ............. | H04B 7/18515 |
| | | | | 342/372 |
| 2007/0075896 A1 * | 4/2007 | Whitehead | ............. | G01S 19/53 |
| | | | | 342/357.36 |
| 2020/0039522 A1 * | 2/2020 | Nakaoka | ............... | B60W 30/02 |

FOREIGN PATENT DOCUMENTS

| | | | |
|---|---|---|---|
| JP | 2011122921 A | * | 6/2011 |
| JP | 2012047495 A | * | 3/2012 |
| JP | 2018-132378 A | | 8/2018 |

OTHER PUBLICATIONS

"Galijan R et al.; Use of GPS Attitude Determination To Calibrate an Array of Inexpensive Accelerometers; SRI International; Transportation Research Board, National Research Council; 2001" (Year: 2001).*

Posture extimation using complementary filter with 9-axis sensor; Kochi University of Technology Advent Calendar 2018; Dec. 12, 2018; retrieved from https://qiita.com/Tanba28/items/5092c3e5e2c631b804f3; 22 pgs with English translation.

Transforming Euler angles and quaternions and rotating vectors; Euler Angles, Quaternion, Rotation; retrieved from https://www.kazetest.com/vcmemo/quaternion/quaternion.htm, 8 pgs with English translation.

* cited by examiner

APPARATUS AND METHOD FOR CALIBRATING INERTIAL SENSOR

CROSS-REFERENCE TO RELATED APPLICATION

This application is based on and claims the benefit of priority from earlier Japanese Patent Application No. 2020-148868 on Sep. 4, 2020, the description of which is incorporated herein by reference.

BACKGROUND

Technical Field

This disclosure relates to an apparatus and a method for calibrating an inertial sensor.

Related Art

A calibration apparatus for calibrating an acceleration sensor mounted to a vehicle is known that calibrates the acceleration sensor when a reference location and a stopping location of the vehicle match and a reference orientation and a stopping orientation of the vehicle match.

DESCRIPTION OF SPECIFIC EMBODIMENTS

Figure 1A:
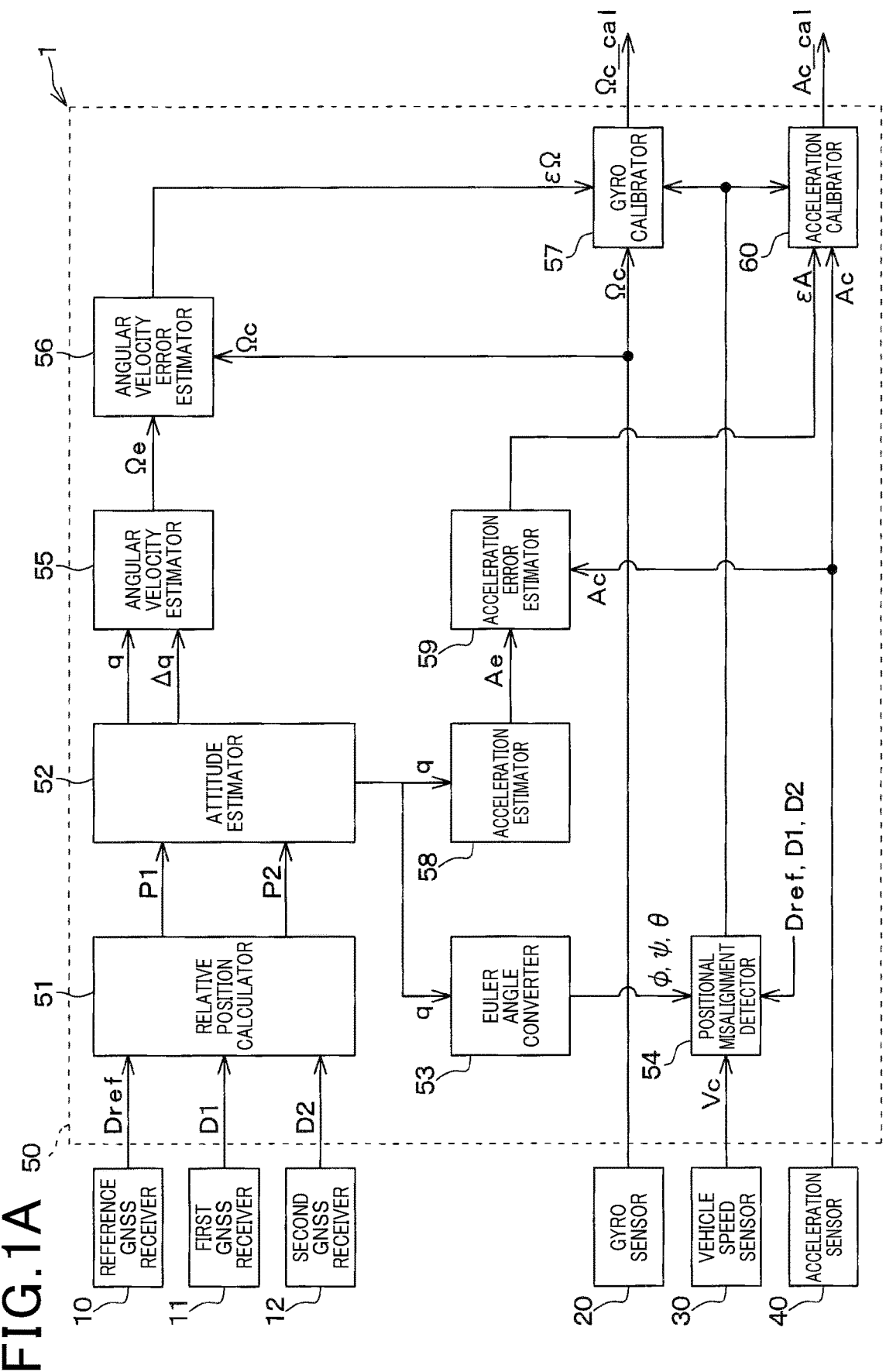
FIG. 1A is a block diagram of a calibration apparatus according to one embodiment.

The above known calibration apparatus, as disclosed in JP-A-2018-132378, calibrates the acceleration sensor when the vehicle is placed at a preset location and orientation. Thus, the calibration apparatus is unable to calibrate the acceleration sensor, for example, while the vehicle is traveling or moving. Besides the acceleration sensor, a gyro sensor for detecting an angular velocity of the vehicle may be calibrated. Since the above known calibration apparatus also calibrates the gyro sensor when the vehicle is placed at a preset location and orientation, the above known calibration apparatus is unable to calibrate the gyro sensor while the vehicle is traveling or moving.

In view of the above, it is desired to have an apparatus and a method for calibrating an inertial sensor that detects an acceleration and an angular velocity of a vehicle, capable of calibrating the inertial sensor whether while the vehicle is traveling or while the vehicle is stopped.

A first aspect of the present disclosure provides an apparatus for calibrating an inertial sensor configured to detect an angular velocity of a vehicle, the vehicle being equipped with at least one reference receiver which receives signals from a plurality of positioning satellites, at least one first receiver which receives signals from the plurality of positioning satellites, and at least one second receiver which receives signals from the plurality of positioning satellites, the apparatus including: a position calculator configured to calculate a first relative position of the first receiver to a position of the reference receiver based on data based on the signals received by the reference receiver from the positioning satellites and data based on the signals received by the first receiver from the positioning satellites, and calculate a second relative position of the second receiver to the position of the reference receiver based on the data based on the signals received by the reference receiver from the positioning satellites and data based on the signals received by the second receiver from the positioning satellites; an attitude estimator configured to estimate a value for an attitude of the vehicle and a value for a change in attitude of the vehicle based on the first relative position and the second relative position; an angular velocity estimator configured to estimate a value for an angular velocity of the vehicle based on the value for the attitude of the vehicle estimated by the attitude estimator and the value for the change in attitude of the vehicle estimated by the attitude estimator; an error estimator configured to, based on the value for the angular velocity of the vehicle estimated by the angular velocity estimator and a value for the angular velocity of the vehicle detected by the inertial sensor, estimate a value for an angular velocity error that is an error between the value for the angular velocity of the vehicle estimated by the angular velocity estimator and the value for the angular velocity of the vehicle detected by the inertial sensor; and a calibrator configured to calibrate the value for the angular velocity of the vehicle detected by the inertial sensor based on the value for the angular velocity error estimated by the error estimator.

A second aspect of the present disclosure provides an apparatus for calibrating an inertial sensor configured to detect an acceleration of a vehicle, the vehicle being equipped with at least one reference receiver which receives signals from a plurality of positioning satellites, at least one first receiver which receives signals from the plurality of positioning satellites, and at least one second receiver which receives signals from the plurality of positioning satellites, the apparatus including: a position calculator configured to calculate a first relative position of the first receiver to a position of the reference receiver based on data based on the signals received by the reference receiver from the positioning satellites and data based on the signals received by the first receiver from the positioning satellites, and calculate a second relative position of the second receiver to the position of the reference receiver based on the data based on the signals received by the reference receiver from the positioning satellites and data based on the signals received by the second receiver from the positioning satellites; a attitude estimator configured to estimate a value for an attitude of the vehicle based on the first relative position and the second relative position; an acceleration estimator configured to estimate a value for an acceleration of the vehicle based on the value for the attitude of the vehicle estimated by the attitude estimator;

an error estimator configured to, based on the value for the acceleration of the vehicle estimated by the acceleration estimator and a value for the acceleration of the vehicle detected by the inertial sensor, estimate a value for an acceleration error that is an error between the value for the acceleration of the vehicle estimated by the acceleration estimator and the value for the acceleration of the vehicle detected by the inertial sensor; and a calibrator configured to calibrate the value for the acceleration of the vehicle detected by the inertial sensor based on the value for the acceleration error estimated by the error estimator.

A third aspect of the present disclosure provides a method for calibrating an inertial sensor configured to detect an angular velocity of a vehicle, the vehicle being equipped with at least one reference receiver which receives signals from a plurality of positioning satellites, at least one first receiver which receives signals from the plurality of positioning satellites, and at least one second receiver which receives signals from the plurality of positioning satellites, the method including: calculating a first relative position of the first receiver to a position of the reference receiver based on data based on the signals received by the reference receiver from the positioning satellites and data based on the signals received by the first receiver from the positioning satellites, and calculate a second relative position of the second receiver to the position of the reference receiver based on the data based on the signals received by the reference receiver from the positioning satellites and data based on the signals received by the second receiver from the positioning satellites; estimating a value for an attitude of the vehicle and a value for a change in attitude of the vehicle based on the first relative position and the second relative position; estimating a value for an angular velocity of the vehicle based on the value for the attitude of the vehicle estimated by the attitude estimator and the value for the change in attitude of the vehicle estimated by the attitude estimator; based on the value for the angular velocity of the vehicle estimated and a value for the angular velocity of the vehicle detected by the inertial sensor, estimating a value for an angular velocity error that is an error between the value for the angular velocity of the vehicle estimated and the value for the angular velocity of the vehicle detected by the inertial sensor; and calibrating the value for the angular velocity of the vehicle detected by the inertial sensor based on the value for the angular velocity error estimated by the error estimator.

A fourth aspect of the present disclosure provides a method for calibrating an inertial sensor configured to detect an acceleration of a vehicle, the vehicle being equipped with at least one reference receiver which receives signals from a plurality of positioning satellites, at least one first receiver which receives signals from the plurality of positioning satellites, and at least one second receiver which receives signals from the plurality of positioning satellites, the method including: calculating a first relative position of the first receiver to a position of the reference receiver based on data based on the signals received by the reference receiver from the positioning satellites and data based on the signals received by the first receiver from the positioning satellites, and calculating a second relative position of the second receiver to the position of the reference receiver based on the data based on the signals received by the reference receiver from the positioning satellites and data based on the signals received by the second receiver from the positioning satellites; estimating a value for an attitude of the vehicle based on the first relative position and the second relative position; estimating a value for an acceleration of the vehicle based on the value for the attitude of the vehicle estimated; based on the value for the acceleration of the vehicle estimated and a value for the acceleration of the vehicle detected by the inertial sensor, estimating a value for an acceleration error that is an error between the value for the acceleration of the vehicle estimated and the value for the acceleration of the vehicle detected by the inertial sensor; and calibrating the value for the acceleration of the vehicle detected by the inertial sensor based on the value for the acceleration error estimated.

The first relative position is a relative position of the first receiver to the reference receiver disposed in the vehicle. The second relative position is a relative position of the second receiver to the reference receiver disposed in the vehicle. Therefore, the first relative position and the second relative position do not change whether the vehicle is stopped or traveling. This allows the calibration apparatus to estimate the value for the attitude of the vehicle based on the first relative position and the second relative position, regardless of whether the vehicle is stopped or traveling. Therefore, whether the vehicle is stopped or traveling, that is, whether the vehicle is stationary or moving, the calibration apparatus can calibrate the inertial sensor based on the estimated value for the attitude of the vehicle.

Hereinafter, exemplary embodiments of the present disclosure will be described in detail with reference to the accompanying drawings, in which like reference numerals refer to similar elements and duplicated description thereof will be omitted.

A calibration apparatus 50 is an inertial sensor calibration apparatus and is used in, for example, a vehicle 1. The vehicle 1 will now be described.

As illustrated in FIG. 1A, the vehicle 1 includes a reference Global Navigation Satellite System (GNSS) receiver 10, a first GNSS receiver 11, a second GNSS receiver 12, a gyro sensor 20, a vehicle speed sensor 30, an acceleration sensor 40, and a calibration apparatus 50.

Figure 2:
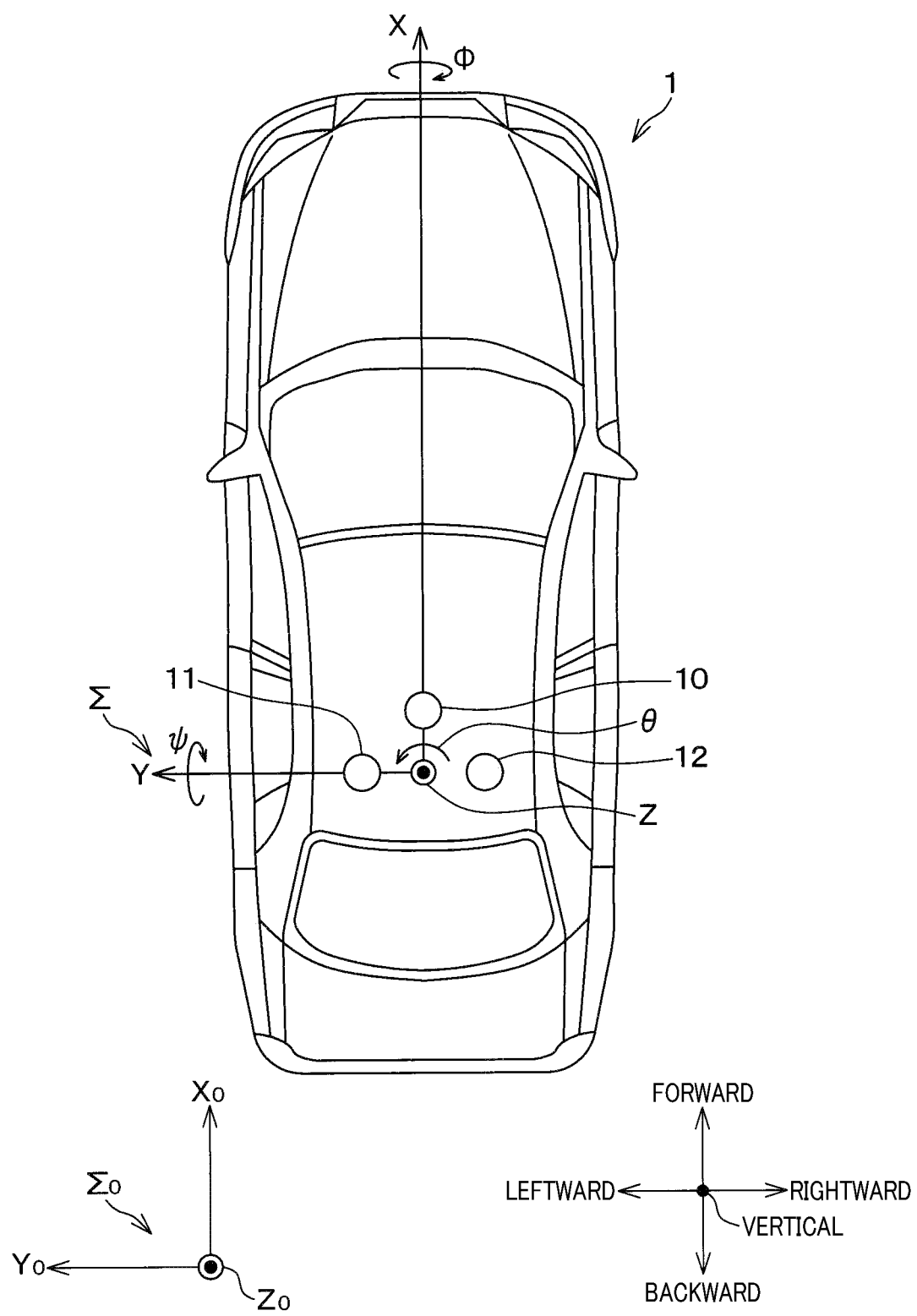
FIG. 2 is a top view of a vehicle carrying the calibration apparatus.

The reference GNSS receiver 10 corresponds to a reference receiver. As illustrated in FIG. 2, the reference GNSS receiver 10 is disposed in the vehicle 1. The reference GNSS receiver 10 receives signals from a plurality of positioning satellites (not shown). As illustrated in FIG. 1A, the reference GNSS receiver 10 transmits reference data Dref to the calibration apparatus 50 based on the received signals. The calibration apparatus 50 will be described later. The reference data Dref includes, for example, a wavenumber and a phase of a carrier wave, ephemeris and the like, from each positioning satellite with respect to time. The ephemeris is orbital information of the positioning satellite.

The first GNSS receiver 11 corresponds to a first receiver. The first GNSS receiver 11 is mounted to the vehicle 1 and disposed to the left of and behind the reference GNSS receiver 10 as illustrated in FIG. 2. Like the reference GNSS receiver 10, the first GNSS receiver 11 receives signals from the plurality of positioning satellites (not shown). As illustrated in FIG. 1A, the first GNSS receiver 11 transmits first data D1 to the calibration apparatus 50 based on the received signals. The first data D1 includes, for example, a wavenumber and a phase of a carrier wave, ephemeris and the like, from each positioning satellite with respect to time.

The second GNSS receiver 12 corresponds to a second receiver. The second GNSS receiver 12 is mounted to the vehicle 1 and disposed to the right of and behind the reference GNSS receiver 10 as illustrated in FIG. 2. Like the reference GNSS receiver 10 and the first GNSS receiver 11, the second GNSS receiver 12 receives signals from the plurality of positioning satellites (not shown). As illustrated in FIG. 1A, the second GNSS receiver 12 transmits second data D2 to the calibration apparatus 50 based on the received signals. The second data D2 includes, for example, a wavenumber and a phase of a carrier wave, ephemeris and the like, from each positioning satellite with respect to time. The positioning satellites used for the reference GNSS receiver 10, the first GNSS receiver 11, and the second GNSS receiver 12 may include Global Positioning System (GPS) satellites, Global Navigation Satellite System (GLONASS) satellites, Galileo satellites, quasi-zenith satellites, and other satellites.

The gyro sensor 20 corresponds to an inertial sensor. As illustrated in FIG. 1A, the gyro sensor 20 transmits, to the calibration apparatus 50 (described later), a signal corresponding to a detected angular velocity $\Omega c$ of the vehicle 1.

The vehicle speed sensor 30 transmits, to the calibration apparatus 50, a signal corresponding to a vehicle speed Vc, where the vehicle speed Vc is the magnitude of speed of the vehicle 1.

The acceleration sensor 40 corresponds to an inertial sensor. As illustrated in FIG. 1A, the acceleration sensor 40 transmits, to the calibration apparatus 50 (described later), a signal corresponding to a detected acceleration Ac of the vehicle 1.

The calibration apparatus 50 is configured around at least one microcomputer formed of a central processing unit (CPU), non-transitory tangible storage media, such as a read-only memory (ROM), a random-access memory (RAM), a flash memory and the like, and an input-output interface. The CPU executes programs stored in the ROM or the flash memory, where the RAM is used as a workspace. In addition, the calibration apparatus 50 calibrates the gyro sensor 20 and the acceleration sensor 40 by the CPU executing a calibration program. In addition, as described later, the calibration apparatus 50 executes another program than the calibration program to detect a positional misalignment between the reference GNSS receiver 10 and the first GNSS receiver 11 or the second GNSS receiver 12. The positional misalignment between the reference GNSS receiver 10 and the first GNSS receiver 11 or the second GNSS receiver 12 means a deviation in predetermined positional relationship between the reference GNSS receiver 10, the first GNSS receiver 11, and the second GNSS receiver 12.

The calibration apparatus 50 includes, as functional blocks, a relative position calculator 51, an attitude estimator 52, an Euler angle converter 53, and a positional misalignment detector 54. The calibration apparatus 50 further includes, as functional blocks, an angular velocity estimator 55, an angular velocity error estimator 56, a gyro calibrator 57, an acceleration estimator 58, an acceleration error estimator 59, and an acceleration calibrator 60.

The relative position calculator 51 calculates a first relative position vector P1 based on the reference data Dref from the reference GNSS receiver 10 and the first data D1 from the first GNSS receiver 11. The relative position calculator 51 calculates a second relative position vector P2 based on the reference data Dref from the reference GNSS receiver 10 and the second data D2 from the second GNSS receiver 12. The first relative position vector P1 is a vector representing a relative position of the first GNSS receiver 11 to the reference GNSS receiver 10 in the absolute coordinate system $\Sigma o$. The second relative position vector P2 is a vector representing a relative position of the second GNSS receiver 12 to the reference GNSS receiver 10 in the absolute coordinate system $\Sigma o$. As illustrated in FIG. 2, the absolute coordinate system $\Sigma o$ is a coordinate system fixed in the space outside the vehicle 1. Xo, Yo, and Zo axes of the absolute coordinate system $\Sigma o$ are orthogonal to each other. This absolute coordinate system $\Sigma o$ is represented in a right-handed system. The relative position calculator 51 is responsible for execution of step S206 described later.

The attitude estimator 52 uses the Kalman filter to estimate an attitude quantity q of the vehicle 1 based on the first relative position vector P1 and the second relative position vector P2 calculated by the relative position calculator 51. The attitude estimator 52 estimates a change in attitude quantity $\Delta q$ based on the estimated attitude quantity q. Details of estimation of the attitude quantity q and the change in attitude quantity $\Delta q$ of the vehicle 1 will be described later. The attitude estimator 52 is responsible for execution of step S208 described later.

The Euler angle converter 53 calculates a roll angle $\varphi$, a pitch angle $\psi$, and a yaw angle $\theta$ of the vehicle 1 based on the attitude quantity q estimated by the attitude estimator 52. The Euler angle converter 53 is responsible for execution of step S106 described later.

As illustrated in FIG. 2, a coordinate system with a given position in the vehicle 1 as the origin is referred to as a vehicle coordinate system $\Sigma$. For example, the given position in the vehicle is the center of gravity of the vehicle 1. The forward direction of the vehicle 1 is the positive direction of the X-axis in the vehicle coordinate system $\Sigma$. The leftward direction of the vehicle 1 is the positive direction of the Y axis in the vehicle coordinate system $\Sigma$. The upward direction of the vehicle 1 is the positive direction of the Z axis in the vehicle coordinate system $\Sigma$. The vehicle coordinate system $\Sigma$ is represented as a right-handed system.

A roll angle $\varphi$ is a rotation angle about the X-axis in the vehicle coordinate system $\Sigma$. The positive direction of the roll angle $\varphi$ is the clockwise direction as the positive direction of the X-axis is viewed from the origin of the vehicle coordinate system $\Sigma$. A pitch angle $\psi$ is a rotation angle about the Y-axis in the vehicle coordinate system $\Sigma$. The positive direction of the pitch angle $\psi$ is the clockwise direction as the positive direction of the Y-axis is viewed from the origin of the vehicle coordinate system $\Sigma$. A yaw angle $\theta$ is a rotation angle about the Z-axis in the vehicle coordinate system $\Sigma$. The positive direction of the yaw angle $\theta$ is the clockwise direction as the positive direction of the Z-axis is viewed from the origin of the vehicle coordinate system $\Sigma$. The roll angle $\varphi$, the pitch angle $\psi$, and the yaw angle $\theta$ are synonymous with ZYX Euler angles, that is, angles by which the vehicle coordinate system $\Sigma$ is rotated about the Z-axis, the Y-axis, and the X-axis in this order. Details of calculation of the roll angle $\varphi$, the pitch angle $\psi$, and the yaw angle $\theta$ will be described later.

The positional misalignment detector 54 detects whether there is a positional misalignment between the reference GNSS receiver 10 and the first GNSS receiver 11 or the second GNSS receiver 12, based on the yaw angle $\theta$ calculated by the Euler angle converter 53 and the vehicle speed Vc detected by the vehicle speed sensor 30. Details of detection of the positional misalignment between the reference GNSS receiver 10, the first GNSS receiver 11 or the second GNSS receiver 12 will be described later.

Figure 1B:
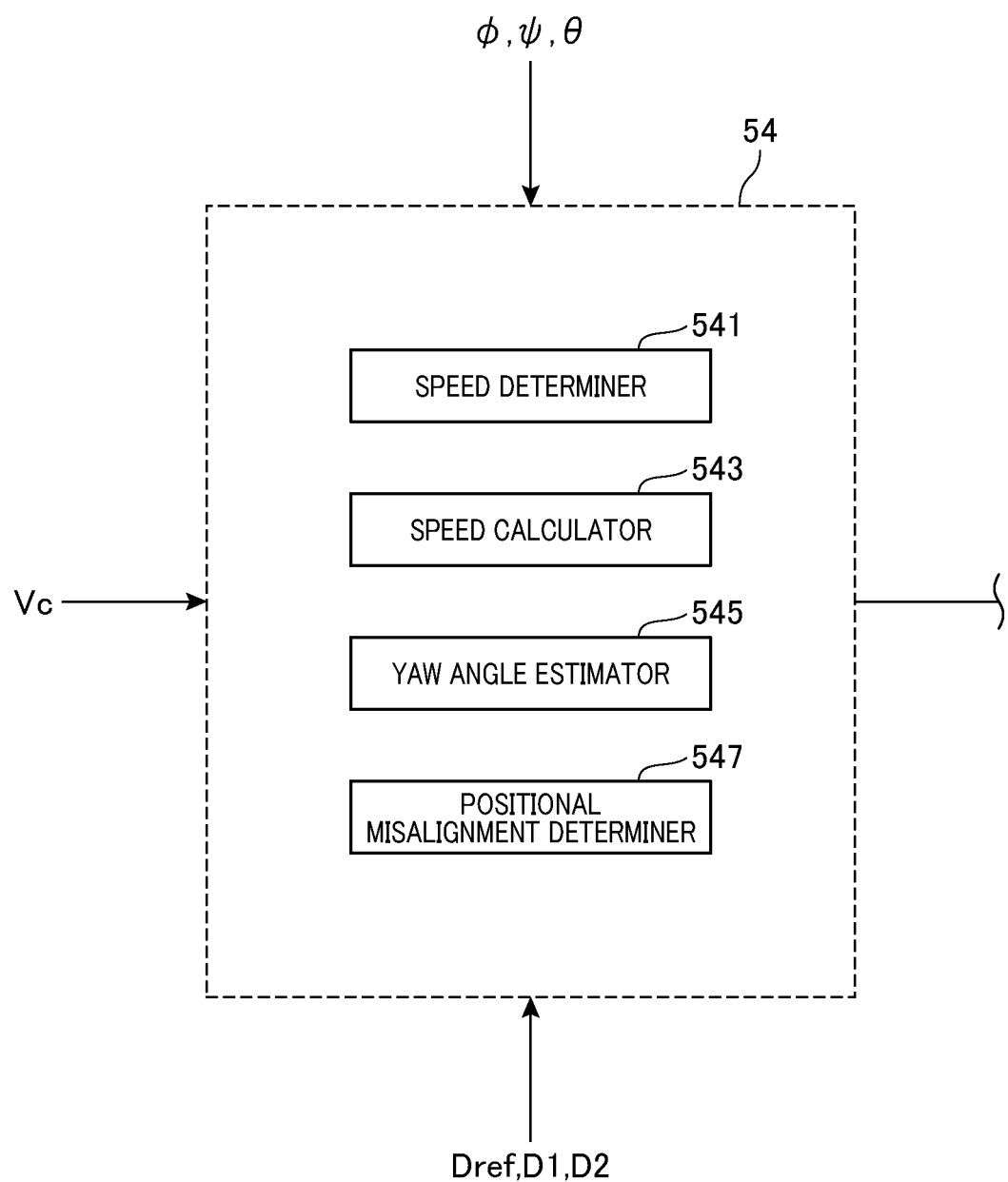
FIG. 1B is a functional block diagram of a positional misalignment detector of the calibration apparatus.

As illustrated in FIG. 1B, the positional misalignment detector 54 includes, as functional blocks, a speed determiner 541, a speed calculator 543, a yaw angle estimator 545, and a positional misalignment determiner 547.

The angular velocity estimator 55 calculates an estimated angular velocity $\Omega e$ of the vehicle 1 based on the attitude quantity q and the change in attitude quantity $\Delta q$ estimated by the attitude estimator 52. Details of estimation of the estimated angular velocity $\Omega e$ will be described later. The angular velocity estimator 55 is responsible for execution of step S210 described later.

The angular velocity error estimator 56 estimates an angular velocity error $\varepsilon\Omega$ of the vehicle 1 based on the estimated angular velocity $\Omega e$ estimated by the angular velocity estimator 55 and the detected angular velocity $\Omega c$ detected by the gyro sensor 20. The angular velocity error $\varepsilon\Omega$ is an error between the estimated angular velocity $\Omega e$ estimated by the angular velocity estimator 55 and the detected angular velocity $\Omega c$ detected by the gyro sensor 20. As described later, the angular velocity error $\varepsilon\Omega$ includes a value for a change in detected angular velocity $\Omega c$ detected by the gyro sensor 20 when the angular velocity of the vehicle 1 changes or a value for the detected angular velocity $\Omega c$ detected by the gyro sensor 20 when the vehicle 1 is stopped. Details of estimation of the angular velocity error $\varepsilon\Omega$ will be described later. The angular velocity error estimator 56 is responsible for execution of step S212 described later.

The gyro calibrator 57 calibrates the detected angular velocity $\Omega c$ detected by the gyro sensor 20 based on the angular velocity error $\varepsilon\Omega$ estimated by the angular velocity error estimator 56. Details of calibration of the detected angular velocity $\Omega c$ will be described later. The gyro calibrator 57 is responsible for execution of step S214 described later.

The acceleration estimator 58 calculates an estimated acceleration Ae of the vehicle 1 based on the attitude quantity q estimated by the attitude estimator 52. Details of estimation of the estimated acceleration Ae will be described later. The acceleration estimator 58 is responsible for execution of step S216 described later.

The acceleration error estimator 59 estimates an acceleration error $\varepsilon A$ of the vehicle 1 based on the estimated acceleration Ae estimated by the acceleration estimator 58 and the detected acceleration Ac detected by the acceleration sensor 40. The acceleration error $\varepsilon A$ is an error between the estimated acceleration Ae estimated by the acceleration estimator 58 and the detected acceleration Ac detected by the acceleration sensor 40. The acceleration error $\varepsilon A$ includes, as described below, a value for a change in detected acceleration Ac detected by the acceleration sensor 40 when the acceleration of the vehicle 1 changes or a value for the detected acceleration Ac detected by the acceleration sensor 40 when the vehicle 1 is stopped. Details of estimation of the acceleration error $\varepsilon A$ will be described below. The acceleration error estimator 59 is responsible for execution of step S218 described later.

The acceleration calibrator 60 calibrates the detected acceleration Ac detected by the acceleration sensor 40 based on the acceleration error $\varepsilon A$ estimated by the acceleration error estimator 59. Details of calibration of the detected acceleration Ac will be described later. The acceleration calibrator 60 is responsible for execution of step S220 described later.

The vehicle 1 is configured as described above. The calibration apparatus 50 mounted to the vehicle 1 calibrates the gyro sensor 20 and the acceleration sensor 40. The calibration apparatus 50 detects a positional misalignment between the reference GNSS receiver 10 and the first GNSS receiver 11 or the second GNSS receiver 12.

Figure 3:
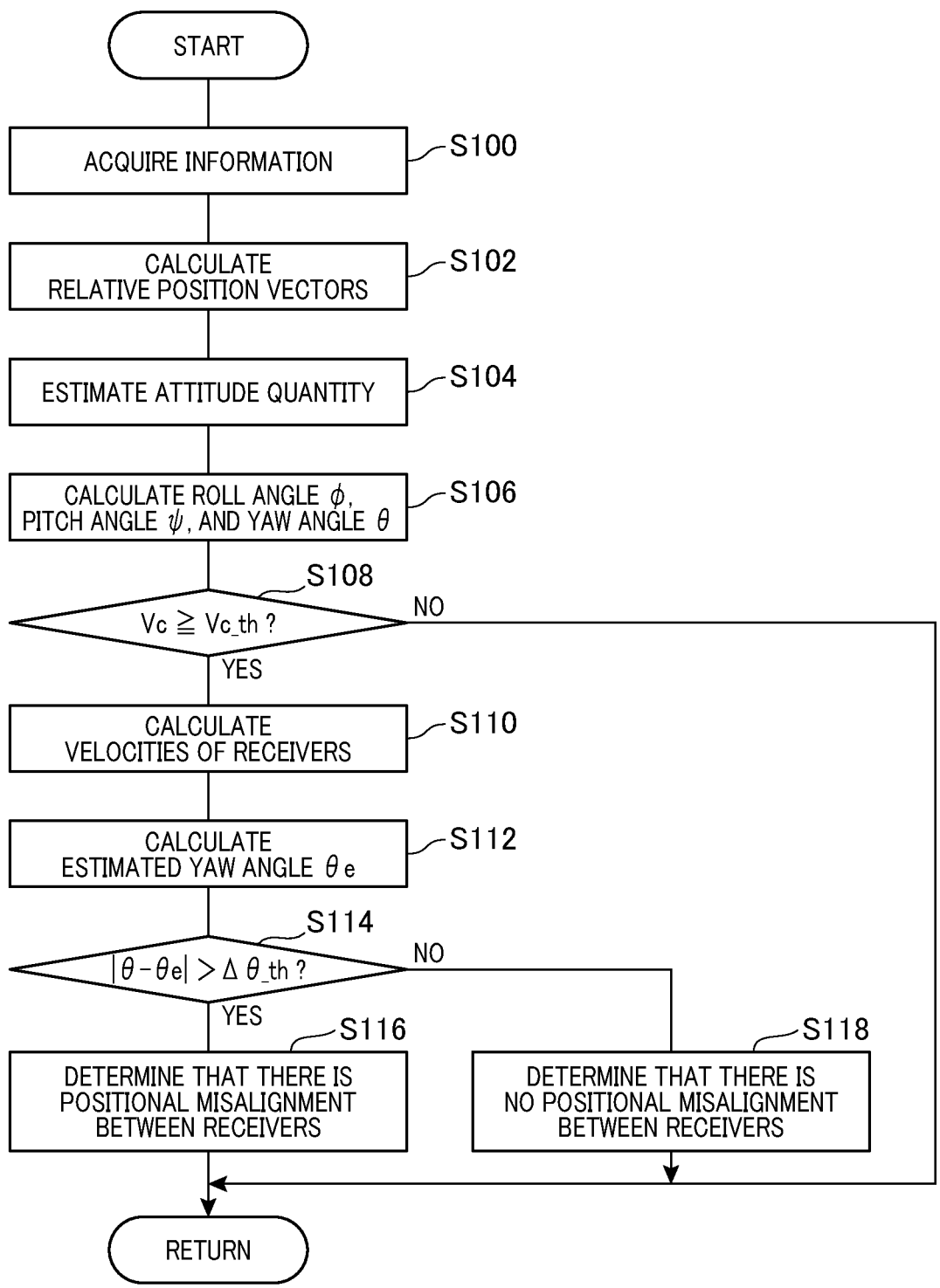
FIG. 3 is a flowchart of a positional misalignment detection process performed by the calibration apparatus.

A positional misalignment detection process of detecting a positional misalignment between the reference GNSS receiver 10 and the first GNSS receiver 11 or the second GNSS receiver 12 performed by the calibration apparatus 50 executing a positional misalignment detection program will be described with reference to the flowchart of FIG. 3. For example, this positional misalignment detection program is executed when the ignition is turned on in the vehicle 1. In the following, a period of a series of operations from the start of step S100 to the return to step S100 is defined as a control cycle of the positional misalignment detection process performed by the calibration apparatus 50.

At step S100, the calibration apparatus 50 acquires various information.

More specifically, the calibration apparatus 50 acquires the reference data Dref from the reference GNSS receiver 10. The calibration apparatus 50 acquires the first data D1 from the first GNSS receiver 11. The calibration apparatus 50 acquires the second data D2 from the second GNSS receiver 12. The calibration apparatus 50 further acquires a vehicle speed Vc from the vehicle speed sensor 30.

At step S102, the calibration apparatus 50 calculates a first relative position vector P1 and a second relative position vector P2.

For example, the calibration apparatus 50 uses a wavenumber and a phase of the contemporaneous carrier wave in each of the reference data Dref and the first data D1 acquired at step S100 to calculate the first relative position vector P1 using the Moving Baseline RTK method. The calibration apparatus 50 uses a wavenumber and a phase of the contemporaneous carrier wave in each of the data for reference Dref and the second data D2 acquired at step S100 to calculate the second relative position vector P2 using the Moving Baseline RTK method. RTK is an abbreviation for Real Time Kinematic.

At step S104, the calibration apparatus 50 estimates an attitude quantity q and a change in attitude quantity $\Delta q$ of the vehicle 1 based on the first relative position vector P1 and the second relative position vector P2 calculated at step S102. details of estimation of the attitude quantity q and the change in attitude quantity $\Delta q$ of the vehicle 1 will be described later.

At step S106, the calibration apparatus 50 calculates a roll angle $\varphi$, a pitch angle $\psi$, and a yaw angle $\theta$ of the vehicle 1 based on the attitude quantity q estimated at step S104. details of calculation of the roll angle $\varphi$, the pitch angle $\psi$, and the yaw angle $\theta$ of the vehicle 1 will be described later. Step S106 is performed by the Euler angle converter 53 that corresponds to a converter.

The reference GNSS receiver 10, the first GNSS receiver 11, and the second GNSS receiver 12 are disposed in the vehicle 1. Therefore, as the vehicle speed Vc increases, the velocity of the reference GNSS receiver 10, the velocity of the first GNSS receiver 11, and the velocity of the second GNSS receiver 12 increase. As these velocities become higher, values of these velocities become more stable, and thus the accuracy of calculating these velocities becomes higher. Furthermore, this improves the accuracy of calculating the estimated yaw angle $\theta e$ described later.

At step S108 subsequent to step S106, the calibration apparatus 50 determines whether the vehicle speed Vc acquired at step S100 is equal to or higher than a vehicle speed threshold Vc_th. The calibration apparatus 50 thereby determines whether the accuracy of calculation of the velocity and the estimated yaw angle $\theta e$, which will be described later, is high. The vehicle speed threshold Vc_th is set by experiment, simulation, or the like. As described above, the vehicle speed Vc is a magnitude of the speed of the vehicle 1. Step S108 is performed by the speed determiner 541 of the positional misalignment detector 54.

If the vehicle speed Vc is equal to or higher than the vehicle speed threshold Vc_th, the process flow proceeds to step S110. If the vehicle speed Vc is less than the vehicle speed threshold Vc_th, the above calculation accuracy is low. For this reason, the calibration apparatus 50 does not detect the positional misalignment between the reference GNSS receiver 10 and the first GNSS receiver 11 or the second GNSS receiver 12, and the process flow then returns to step S100.

At step S110 subsequent to step S108, the calibration apparatus 50 calculates the reference receiver velocity Vref, the first receiver velocity V1, and the second receiver velocity V2 since the calculation accuracy is high. For example, the calibration apparatus 50 calculates the reference receiver velocity Vref, the first receiver velocity V1, and the second receiver velocity V2 using the Doppler effect of the carrier waves from the positioning satellites (not shown). The reference receiver velocity Vref is a velocity vector of the reference GNSS receiver 10 in the absolute coordinate system Σo. The first receiver velocity V1 is a velocity vector of the first GNSS receiver 11 in the absolute coordinate system Σo. The second receiver velocity V2 is a velocity vector of the second GNSS receiver 12 in the absolute coordinate system Σo. Step S110 is performed by the speed calculator 543 of the positional misalignment detector 54.

More specifically, the calibration apparatus 50 calculates, based on the wavenumber of the carrier wave received from each positioning satellite included in the reference data Dref acquired at step S100, a wavelength and a frequency of this carrier wave. In addition, the calibration apparatus 50 calculates the velocity of each positioning satellite based on the ephemeris included in the reference data Dref acquired at step S100. The calibration apparatus 50 calculates the reference receiver velocity Vref based on the calculated frequency of the carrier wave, the calculated velocity of the positioning satellite, the frequency of the carrier wave transmitted from the positioning satellite, and the velocity of light. The calibration apparatus 50 also calculates the first receiver velocity V1 in the same manner as described above. Further, the calibration apparatus 50 calculates the second receiver velocity V2 in the same manner as described above. As described above, the ephemeris is orbital information of the positioning satellite. The frequency of the carrier wave transmitted from the positioning satellite is set according to the positioning satellite.

Then, at step S112, the calibration apparatus 50 calculates an average of the reference receiver velocity Vref, the first receiver velocity V1, and the second receiver velocity V2 calculated at step S110. The calibration apparatus 50 thereby calculates an average speed Vc_ave of the vehicle 1 in the absolute coordinate system Σo. Calculating these average values allows noise included in the average speed Vc_ave to be smoothed out. Therefore, the noise included in the average speed Vc_ave is reduced as compared to cases where one of the reference receiver velocity Vref, the first receiver velocity V1, and the second receiver velocity V2 is representative of the estimated speed of the vehicle 1.

Further, the calibration apparatus 50, for example, substitutes an Xo-axis directional component and a Yo-axis directional component of this calculated average speed Vc_ave into the following relational expression (1). The calibration apparatus 50 thereby estimates the estimated yaw angle θe of the vehicle 1. In the following relational expression (1), Vc_ave_Xo is the Xo-axis directional component of the average speed Vc_ave in the absolute coordinate system Σo. Vc_ave_Yo is the Yo-axis directional component of the average speed Vc_ave in the absolute coordinate system Σo. Step S112 is performed by the yaw angle estimator 545 of the positional misalignment detector 54.

$$\theta e = \arctan\left[\frac{Vc\_ave\_Yo}{Vc\_ave\_Xo}\right] \quad (1)$$

Subsequently, at step S114, the calibration apparatus 50 calculates an absolute value of a difference between the yaw angle θ calculated at step S106 and the estimated yaw angle θe calculated at step S112, which is denoted by |θ−θe|.

In cases where there is no positional misalignment between the reference GNSS receiver 10, the first GNSS receiver 11, and the second GNSS receiver 12, the yaw angle θ calculated at step S106 and the estimated yaw angle θe calculated at step S112 should be equal.

As described above, the yaw angle θ calculated at step S106 is calculated based on the attitude quantity q of the vehicle 1 estimated at step S104. Further, this attitude quantity q of the vehicle 1 is calculated based on the first relative position vector P1 and the second relative position vector P2 calculated at step S102. As described above, the first relative position vector P1 is a vector representing a relative position of the first GNSS receiver 11 to the position of the reference GNSS receiver 10 in the absolute coordinate system Σo. The second relative position vector P2 is a vector representing a relative position of the second GNSS receiver 12 to the position of the reference GNSS receiver 10 in the absolute coordinate system Σo.

The yaw angle θ calculated at step S106 is therefore calculated based on the first relative position vector P1 and the second relative position vector P2 calculated at step S102. In cases where there is a positional misalignment between the reference GNSS receiver 10 and the first GNSS receiver 11 or the second GNSS receiver 12, values of the first relative position vector P1 and the second relative position vector P2 change as data of the misaligned receiver changes.

Therefore, in cases where there is a positional misalignment between the positions of the reference GNSS receiver 10 and the first GNSS receiver 11 or the second GNSS receiver 12 with the vehicle 1 in the same attitude, the value of the yaw angle θ calculated at step S106 is different from the value of the yaw angle θ in cases where there is no positional misalignment between the reference GNSS receiver 10, the first GNSS receiver 11, and the second GNSS receiver 12.

As described above, the estimated yaw angle θe calculated at step S112 is calculated using the reference receiver velocity Vref, the first receiver velocity V1, and the second receiver velocity V2. Since the reference GNSS receiver 10, the first GNSS receiver 11, and the second GNSS receiver 12 are located in the vehicle 1, the reference receiver velocity Vref, the first receiver velocity V1 and the second receiver velocity V2 vary with the vehicle speed Vc.

The estimated yaw angle θe calculated at step S112 thus varies with the vehicle speed Vc. Even in cases where there is a positional misalignment between the reference GNSS receiver 10 and the first GNSS receiver 11 or the second GNSS receiver 12, the vehicle speed Vc does not change.

Therefore, even in cases where there is a positional misalignment between the reference GNSS receiver 10 and the first GNSS receiver 11 or the second GNSS receiver 12, the estimated yaw angle θe calculated at step S112 does not change.

From the above, in cases where there is a positional misalignment between the reference GNSS receiver 10 and the first GNSS receiver 11 or the second GNSS receiver 12, the values of the yaw angle θ calculated at step S106 and the estimated yaw angle θe calculated at step S112 are not the same but different. Thus, the above absolute value |θ−θe| increases as compared to cases where there is a positional misalignment between the reference GNSS receiver 10 and the first GNSS receiver 11 or the second GNSS receiver 12.

Therefore, at step S114, the calibration apparatus 50 determines whether the calculated absolute value |θ−θe| is greater than a positional misalignment threshold Δθ_th. The calibration apparatus 50 thereby detects a positional misalignment between the reference GNSS receiver 10 and the first GNSS receiver 11 or the second GNSS receiver 12. The positional misalignment threshold Δθ_th is set by experiment, simulation, or the like.

If the absolute value |θ−θe| is greater than the positional misalignment threshold Δθ_th, the process flow proceeds to step S116. If the absolute value |θ−θe| is equal to or less than the positional misalignment threshold Δθ_th, the process flow proceeds to step S118.

At step S116 subsequent to step S114, as the absolute value |θ−θe| is greater than the positional misalignment threshold Δθ_th, the calibration apparatus 50 determines that there is a positional misalignment between the reference GNSS receiver 10 and the first GNSS receiver 11 or the second GNSS receiver 12. This determination is stored, for example, in the RAM of the calibration apparatus 50. Thereafter, the process flow returns to step S100.

At step S118 subsequent to step S114, as the absolute value |θ−θe| is equal to or less than the positional misalignment threshold Δθ_th, the calibration apparatus 50 determines that there is no positional misalignment between the reference GNSS receiver 10, the first GNSS receiver 11, and the second GNSS receiver 12. This determination is stored, for example, in the RAM of the calibration apparatus 50. Thereafter, the process flow returns to step S100. Steps S114, S116, and S118 are performed by the positional misalignment determiner 547 of the positional misalignment detector 54.

As described above, the calibration apparatus 50 detects the presence or absence of a positional misalignment between the reference GNSS receiver 10 and the first GNSS receiver 11 or the second GNSS receiver 12.

How to estimate the attitude quantity q of the vehicle 1 at step S104 in the calibration apparatus 50 will now be described.

To describe how to estimate the attitude quantity q, some terms are defined as follows.

Position coordinates of the reference GNSS receiver 10 in the vehicle coordinate system Σ are represented by Ant_ref. Position coordinates of the first GNSS receiver 11 in the vehicle coordinate system Σ are represented by Ant1. Position coordinates of the second GNSS receiver 12 in the vehicle coordinate system Σ are represented by Ant2. For example, the X coordinate of Ant_ref in the vehicle coordinate system Σ is set to 1. The Y coordinate of Ant_ref in the vehicle coordinate system Σ is set to 0. The Z coordinate of Ant_ref in the vehicle coordinate system Σ is set to 0. The X coordinate of Ant1 in the vehicle coordinate system Σ is set to 0. The Y-coordinate of Ant1 in the vehicle coordinate system Σ is set to 1. The Z-coordinate of Ant1 in the vehicle coordinate system Σ is set to 0. The X-coordinate of Ant2 in the vehicle coordinate system Σ is set to 0. The Y-coordinate of Ant2 in the vehicle coordinate system Σ is set to −1. The Z-coordinate of Ant2 in the vehicle coordinate system Σ is set to 0.

Ant_ref is expressed as in the following relational expression (2-1). Ant1 is expressed as the following relational expression (2-2). Ant2 is expressed as the following relational expression (2-3). In the relational expressions (2-1) to (2-3), the superscript 'T' is the matrix transpose operator.

$$\text{Ant\_ref} = [1\ 0\ 0]^T \quad (2\text{-}1)$$

$$\text{Ant1} = [0\ 1\ 0]^T \quad (2\text{-}2)$$

$$\text{Ant2} = [0\ -1\ 0]^T \quad (2\text{-}3)$$

The attitude quantity q of the vehicle 1 is represented by a quaternion. The quaternion represents a rotation of the vehicle 1 in the three-dimensional space. four components of the attitude quantity q are denoted as q0, q1, q2, and q3. These components q0, q1, q2, and q3 include information about the attitude of the vehicle 1.

In such a quaternion representation, the attitude quantity q is expressed as shown in the following relational expressions (3-1) and (3-2). The coordinate transformation matrix E, which transforms position coordinates in the vehicle coordinate system Σ into position coordinates in the absolute coordinate system Σo, is expressed using the attitude quantity q as shown in the following relational expression (3-3). In the following relational expression (3-1), i, j, and k are basis elements of quaternions. In the following relational expression (3-2), the superscript 'T' is the matrix transpose operator.

$$q = q0 + q1 \times i + q2 \times j + q3 \times k \quad (3\text{-}1)$$

$$q = [q0\ q1\ q2\ q3]^T \quad (3\text{-}2)$$

$$E = \begin{bmatrix} q0^2 + q1^2 - q2^2 - q3^2 & 2 \times (q1 \times q2 + q0 \times q3) & 2 \times (q1 \times q3 - q0 \times q2) \\ 2 \times (q1 \times q2 - q0 \times q3) & q0^2 - q1^2 + q2^2 - q3^2 & 2 \times (q2 \times q3 + q0 \times q1) \\ 2 \times (q1 \times q3 + q0 \times q2) & 2 \times (q2 \times q3 - q0 \times q1) & q0^2 - q1^2 - q2^2 + q3^2 \end{bmatrix} \quad (3\text{-}3)$$

Let us denote the position coordinates of the reference GNSS receiver 10 in the absolute coordinate system Σo as Ant_ref_abs. Let us denote the position coordinates of the first GNSS receiver 11 in the absolute coordinate system Σo as Ant1_abs. Let us denote the position coordinates of the second GNSS receiver 12 in the absolute coordinate system Σo as Ant2_abs.

Ant_ref_abs is calculated by multiplying Ant_ref by the above coordinate transformation matrix E, as shown in the following relational expression (4-1). Ant1_abs is calculated by multiplying Ant1 by the above coordinate transformation matrix E, as shown in the following relational expression (4-2). Ant2_abs is calculated by multiplying Ant2 by the above coordinate transformation matrix E, as shown in the following relational expression (4-3). As described above, Ant_ref represents position coordinates of the reference GNSS receiver 10 in the vehicle coordinate system Σ. Ant1 represents position coordinates of the first GNSS receiver 11 in the vehicle coordinate system Σ. Ant2 represents position coordinates of the second GNSS receiver 12 in the vehicle coordinate system Σ.

$$\text{Ant\_ref\_abs} = E \times \text{Ant\_ref} = \begin{bmatrix} q0^2 + q1^2 - q2^2 - q3^2 \\ 2 \times (q1 \times q2 - q0 \times q3) \\ 2 \times (q1 \times q3 + q0 \times q2) \end{bmatrix} \quad (4\text{-}1)$$

$$\text{Ant1\_abs} = E \times \text{Ant1} = \begin{bmatrix} 2 \times (q1 \times q2 + q0 \times q3) \\ q0^2 - q1^2 + q2^2 - q3^2 \\ 2 \times (q2 \times q3 - q0 \times q1) \end{bmatrix} \quad (4\text{-}2)$$

$$\text{Ant2\_abs} = E \times \text{Ant2} = \begin{bmatrix} -2 \times (q1 \times q2 + q0 \times q3) \\ -(q0^2 - q1^2 + q2^2 - q3^2) \\ -2 \times (q2 \times q3 - q0 \times q1) \end{bmatrix} \quad (4\text{-}3)$$

Further, a six-dimensional number vector having f11, f12, f13, f21, f22 and f23 as components is defined as shown in the following relational expression (5).

f11 is represented by subtracting the Xo-axis directional component of the Ant_ref_abs from the Xo-axis directional component of the Ant1_abs. Therefore, f11 is an Xo-axis directional component of a vector, in the absolute coordinate system Σo, representing a relative position of the first GNSS receiver 11 to the position of the reference GNSS receiver 10.

f12 is represented by subtracting the Yo-axis directional component of Ant_ref_abs from the Yo-axis directional component of Ant1_abs. Therefore, f12 is a Yo-axis directional component of a vector, in the absolute coordinate system Σo, representing a relative position of the first GNSS receiver 11 to the position of the reference GNSS receiver 10.

f13 is represented by subtracting the Zo-axis directional component of Ant_ref_abs from the Zo-axis directional component of Ant1_abs. Therefore, f13 is a Zo-axis directional component of a vector, in the absolute coordinate system Σo, representing the relative position of the first GNSS receiver 11 to the position of the reference GNSS receiver 10.

f21 is represented by subtracting the Xo-axis directional component of Ant_ref_abs from the Xo-axis directional component of Ant2_abs. Therefore, f21 is a Xo-axis directional component of a vector, in the absolute coordinate system Σo, representing the relative position of the second GNSS receiver 12 to the position of the reference GNSS receiver 10.

f22 is represented by subtracting the Yo-axis directional component of Ant_ref_abs from the Yo-axis directional component of Ant2_abs. Therefore, f22 is a Yo-axis directional component of a vector, in the absolute coordinate system Σo, representing the relative position of the second GNSS receiver 12 to the position of the reference GNSS receiver 10.

f23 is represented by subtracting the Zo-axis directional component of Ant_ref_abs from the Zo-axis directional component of Ant2_abs. Therefore, f23 is a Zo-axis directional component of a vector, in the absolute coordinate system Σo, representing the relative position of the second GNSS receiver 12 with respect to the position of the reference GNSS receiver 10.

f11, f12, f13, f21, f22, and f23 are values based on the positions of the reference GNSS receiver 10, the first GNSS receiver 11, and the second GNSS receiver 12 that are preset in the vehicle coordinate system Σ.

$$\begin{bmatrix} f11 \\ f12 \\ f13 \\ f21 \\ f22 \\ f23 \end{bmatrix} = \begin{bmatrix} 2 \times (q1 \times q2 + q0 \times q3) - (q0^2 + q1^2 - q2^2 - q3^2) \\ (q0^2 - q1^2 + q2^2 - q3^2) - 2 \times (q1 \times q2 - q0 \times q3) \\ 2 \times (q2 \times q3 - q0 \times q1) - 2 \times (q1 \times q3 + q0 \times q2) \\ -2 \times (q1 \times q2 + q0 \times q3) - (q0^2 + q1^2 - q2^2 - q3^2) \\ -(q0^2 - q1^2 + q2^2 - q3^2) - 2 \times (q1 \times q2 - q0 \times q3) \\ -2 \times (q2 \times q3 - q0 \times q1) - 2 \times (q1 \times q3 + q0 \times q2) \end{bmatrix} \quad (5)$$

The Xo-axis directional component of the first relative position vector P1 in the absolute coordinate system Σo is denoted by x1_rel. The Yo-axis directional component of the first relative position vector P1 in the absolute coordinate system Σo is denoted by y1_rel. The Zo-axis directional component of the first relative position vector P1 in the absolute coordinate system Σo is denoted by z1_rel. The Xo-axis directional component of the second relative position vector P2 in the absolute coordinate system Σo is denoted by x2_rel. The Yo-axis directional component of the second relative position vector P2 in the absolute coordinate system Σo is denoted by y2_rel. The Zo-axis directional component of the second relative position vector P2 in the absolute coordinate system Σo is denoted by z2_rel. As described above, the first relative position vector P1 is a vector representing the relative position of the first GNSS receiver 11 to the position of the reference GNSS receiver 10 in the absolute coordinate system Σo. The second relative position vector P2 is a vector representing the relative position of the second GNSS receiver 12 to the position of the reference GNSS receiver 10 in the absolute coordinate system Σo.

Therefore, as shown in the following relational expression (6), x1_rel of the first relative position vector P1 corresponds to f11. y1_rel of the first relative position vector P1 corresponds to f12. z1_rel of the first relative position vector P1 corresponds to f13. x2_rel of the second relative position vector P2 corresponds to f21. y2_rel of the second relative position vector P2 corresponds to f22. z2_rel of the second relative position vector P2 corresponds to f23. In the relation (6), s is a six-dimensional number vector having x1_rel, y1_rel, z1_rel, x2_rel, y2_rel, and z2_rel as components. f(q) is a six-dimensional number vector with f11, f12, f13, f21, f22, and f23 as components.

$$s = \begin{bmatrix} P1 \\ P2 \end{bmatrix} = \begin{bmatrix} x1\_rel \\ y1\_rel \\ z1\_rel \\ x2\_rel \\ y2\_rel \\ z2\_rel \end{bmatrix} = \begin{bmatrix} \text{Ant1\_abs} - \text{Ant\_ref\_abs} \\ \text{Ant2\_abs} - \text{Ant\_ref\_abs} \end{bmatrix} = \begin{bmatrix} f11 \\ f12 \\ f13 \\ f21 \\ f22 \\ f23 \end{bmatrix} = f(q) \quad (6)$$

It is now assumed that these f11, f12, f13, f21, f22, f23 coincide with x1_rel, y1_rel, z1_rel, x2_rel, y2_rel, z2_rel, respectively. As mentioned above, since f11, f12, f13, f21, f22, and f23 are represented by the attitude quantity q of vehicle 1, the attitude quantity q represented by quaternions can be accurately estimated.

If f(q) is linear, the calibration apparatus 50 can estimate the attitude quantity q using a Kalman filter. However, f(q) is a quadratic function of q0, q1, q2, and q3, as shown in the above relational expression (5), that is, f(q) is nonlinear. As long as f(q) is nonlinear, the calibration apparatus 50 can not use the Kalman filter.

Here, the partial derivative of f(q) with respect to the attitude quantity q allows f(q) to be linearly approximated. Since f(q) is linearly approximated, the calibration apparatus

50 can estimate the attitude quantity using the Kalman filter. Therefore, using this extended Kalman filter, the calibration apparatus 50 estimates the attitude quantity q of the vehicle 1.

Therefore, the calibration apparatus 50 uses a state equation in which the attitude quantity q is a state vector, as shown in the following relational expression (7-1). The calibration apparatus 50 uses an observation equation in which the above-mentioned s is an observation vector for attitude, as shown in the following relational expression (7-2). It is assumed in the following that there is no noise in the state equation and the observation equation. The above s is the six-dimensional number vector represented by the first and second relative position vectors P1 and P2. t is an integer equal to or greater than 0 and represents the number of updates. q(t) is the attitude quantity q during the $t^{th}$ update, and B is a state transition matrix from q(t) to q(t+1).

In addition, it is assumed here that the attitude quantity q of the vehicle 1 does not change in a small amount of time, and this state transition matrix for attitude B is a 4×4 identity matrix, for example, as shown in the following relational expression (7-3). H(t) is an observation matrix that converts q(t) to s(t). The observation matrix for attitude H(t) is calculated by partial differentiation of f(q) with respect to the attitude quantity q, as shown in the following relational expression (7-4). As described above, the components of f(q), that is, f11, f12, f13, f21, f22, and f23, are based on the positions of the reference GNSS receiver 10, the first GNSS receiver 11, and the second GNSS receiver 12, which are preset in the vehicle coordinate system Σ. Therefore, the observation matrix for attitude H(t) is a value based on the positions of the reference GNSS receiver 10, the first GNSS receiver 11, and the second GNSS receiver 12 that are preset in the vehicle coordinate system Σ.

$$q(t+1) = B \times q(t) \tag{7-1}$$

$$s(t) = H(t) \times q(t) \tag{7-2}$$

$$B = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \tag{7-3}$$

$$H(t) = \begin{bmatrix} \frac{\partial f11}{\partial q0} & \frac{\partial f11}{\partial q1} & \frac{\partial f11}{\partial q2} & \frac{\partial f11}{\partial q3} \\ \frac{\partial f12}{\partial q0} & \frac{\partial f12}{\partial q1} & \frac{\partial f12}{\partial q2} & \frac{\partial f12}{\partial q3} \\ \frac{\partial f13}{\partial q0} & \frac{\partial f13}{\partial q1} & \frac{\partial f13}{\partial q2} & \frac{\partial f13}{\partial q3} \\ \frac{\partial f21}{\partial q0} & \frac{\partial f21}{\partial q1} & \frac{\partial f21}{\partial q2} & \frac{\partial f21}{\partial q3} \\ \frac{\partial f22}{\partial q0} & \frac{\partial f22}{\partial q1} & \frac{\partial f22}{\partial q2} & \frac{\partial f22}{\partial q3} \\ \frac{\partial f23}{\partial q0} & \frac{\partial f23}{\partial q1} & \frac{\partial f23}{\partial q2} & \frac{\partial f23}{\partial q3} \end{bmatrix} = \begin{bmatrix} 2 \times q3 - 2 \times q0 & 2 \times q2 - 2 \times q1 & 2 \times q1 + 2 \times q2 & 2 \times q0 + 2 \times q3 \\ 2 \times q0 + 2 \times q3 & -2 \times q1 - 2 \times q2 & 2 \times q2 - 2 \times q1 & -2 \times q3 + 2 \times q0 \\ -2 \times q1 - 2 \times q2 & -2 \times q0 - 2 \times q3 & 2 \times q3 - 2 \times q0 & 2 \times q2 - 2 \times q1 \\ -2 \times q3 - 2 \times q0 & -2 \times q2 - 2 \times q1 & -2 \times q1 + 2 \times q2 & -2 \times q0 + 2 \times q3 \\ -2 \times q0 + 2 \times q3 & 2 \times q1 - 2 \times q2 & -2 \times q2 - 2 \times q1 & 2 \times q3 + 2 \times q0 \\ 2 \times q1 - 2 \times q2 & 2 \times q0 - 2 \times q3 & -2 \times q3 - 2 \times q0 & -2 \times q2 - 2 \times q1 \end{bmatrix} \tag{7-4}$$

The calibration apparatus 50 estimates the attitude amount q, for example, using the following relational expressions (8-1) to (8-5). In the relational expressions, Gq(t) is the Kalman gain at the $t^{th}$ update. Pq is an error covariance matrix of the attitude quantity q. Pq(t|t−1) is a priori error covariance matrix, and is a predicted value of the error covariance matrix for attitude Pq at the $t^{th}$ update based on information of up to the $(t−1)^{th}$ update. Pq(t|t) is the error covariance matrix for attitude Pq based on information of up to the $t^{th}$ update. q(t|t−1) is a priori estimate that is a predicted value of the attitude quantity q at the $t^{th}$ update based on information of up to the $(t−1)^{th}$ update. q(t|t) is a posteriori estimate that is the optimal estimate of the attitude quantity q based on information of up to the $t^{th}$ update. I is the identity matrix. The superscript 'T' is the matrix transpose operator. The superscript '−1' is the matrix inverse operator.

$$Pq(t|t-1) = B \times Pq(t-1|t-1) \times B^T \quad (8\text{-}1)$$

$$q(t|t-1) = B \times q(t-1|t-1) \quad (8\text{-}2)$$

$$Gq(t) = Pq(t|t-1) \times H(t)^T = \{H(t) \times Pq(t|t-1) \times H(t)^T\}^{-1} \quad (8\text{-}3)$$

$$q(t|t) = q(t|t-1) + Gq(t) \times \{s(t) - H(t) \times q(t|t-1)\} \quad (8\text{-}4)$$

$$Pq(t|t) = \{I - Gq(t) \times H(t)\} Pq(t|t-1) \quad (8\text{-}5)$$

Specifically, in the case of the $t^{th}$ update, at step S104, the calibration apparatus 50 substitutes the state transition matrix for attitude B, the error covariance matrix for attitude Pq in the previous control cycle, and the transposed matrix of the state transition matrix for attitude B into the above relational expression (8-1). The calibration apparatus 50 thereby calculates Pq(t|t−1). Pq(t|t−1) is a predicted value of the error covariance matrix for attitude Pq in the current control cycle. As the state transition matrix for attitude B is here the identity matrix, Pq(t|t−1) is the same as the error covariance matrix for attitude Pq in the previous control cycle. The initial value of the error covariance matrix for attitude Pq is set by experiment, simulation, or the like.

The calibration apparatus 50 substitutes the state transition matrix for attitude B and the attitude quantity q in the previous control cycle into the above-mentioned relational expression (8-2). The calibration apparatus 50 thereby calculates q(t|t−1), where q(t|t−1) is a predicted value of the attitude quantity q in the current control cycle. As the state transition matrix for attitude B is here the identity matrix, q(t|t−1) is the same as the attitude quantity q in the previous control cycle. The initial value of the attitude quantity q is set, for example, by experiment, simulation, or the like.

The calibration apparatus 50 substitutes each component of q(t|t−1) calculated above into the above relational expression (7-4). The calibration apparatus 50 thereby calculates the observation matrix for attitude H(t) in the current control cycle.

Further, the calibration apparatus 50 substitutes the above-calculated Pq(t|t−1), the above-calculated observation matrix for attitude H(t), and the transposed matrix of this observation matrix for attitude H(t) into the above-mentioned relational expression (8-3). The calibration apparatus 50 thereby calculates the Kalman gain for attitude Gq(t) in the current control cycle.

The calibration apparatus 50 generates an observation vector for attitude in the current control cycle from the components of the first relative position vector P1 and the components of the second relative position vector P2 calculated at step S102 using the above relational expression (6).

The calibration apparatus 50 substitutes the above calculated q(t|t−1), the above calculated Kalman gain for attitude Gq(t), the above generated observation vector for attitude, and the above calculated observation matrix for attitude H(t) into the above relational expression (8-4). Thus, the calibration apparatus 50 calculates the attitude quantity q(t|t) in the current control cycle.

The calibration apparatus 50 substitutes the identity matrix I, the Kalman gain for attitude Gq(t) calculated above, the observation matrix for attitude H(t) calculated above, and Pq(t|t−1) calculated above into the above-mentioned relational expression (8-5). The calibration apparatus 50 thus calculates the error covariance matrix for attitude Pq(t|t) in the current control cycle. The calibration apparatus 50 can calculate Pq(t+1|t) in the next control cycle using the calculated error covariance matrix for attitude Pq(t|t) in the current control cycle, where Pq(t+1|t) is a predicted value of the error covariance matrix for attitude Pq in the next control cycle.

In this way, the calibration apparatus 50 estimates the attitude quantity q.

How the calibration apparatus 50 estimates the change in attitude quantity Δq at step S104 will now be described.

In the case of the $t^{th}$ update, the calibration apparatus 50 subtracts the attitude quantity q estimated in the previous control cycle from the attitude quantity q estimated in the current control cycle as shown in the following relation (9). In this way, the calibration apparatus 50 estimates the change in attitude quantity Δq. In the following relation (9), q(t) is the attitude quantity q updated for the $t^{th}$ time. q0(t) is q0 of the components of the attitude quantity q updated for the $t^{th}$ time. q1(t) is q1 of the components of the attitude quantity q updated for the $t^{th}$ time. q2(t) is q2 of the components of the attitude quantity q updated for the $t^{th}$ time. q2(t) is q2 of the components of the attitude quantity q updated for the $t^{th}$ time. q3(t) is q3 of the components of the attitude quantity q updated for the $t^{th}$ time.

$$\Delta q = q(t) - q(t-1) = \begin{bmatrix} q0(t) - q0(t-1) \\ q1(t) - q1(t-1) \\ q2(t) - q2(t-1) \\ q3(t) - q3(t-1) \end{bmatrix} \quad (9)$$

As described above, the calibration apparatus 50 estimates the attitude quantity q and the change in attitude quantity Δq.

Next, how the calibration apparatus 50 calculates the roll angle φ, the pitch angle ψ, and the yaw angle θ of the vehicle 1 at step S106 will be described.

The calibration apparatus 50 substitutes the attitude quantity q estimated at step S104 into the following relational expression (10). The calibration apparatus 50 thereby calculates the roll angle φ, the pitch angle ψ, and the yaw angle θ of the vehicle 1. The formula (10) is a relational expression for converting the quaternion into the Euler angles.

$$\begin{bmatrix} \varphi \\ \psi \\ \theta \end{bmatrix} = \begin{bmatrix} \arctan\left[\dfrac{2 \times (q0 \times q1 + q2 \times q3)}{q0^2 - q1^2 - q2^2 + q3^2}\right] \\ \arcsin[2 \times (q0 \times q2 - q1 \times q3)] \\ \arctan\left[\dfrac{2 \times (q0 \times q3 + q1 \times q2)}{q0^2 + q1^2 - q2^2 - q3^2}\right] \end{bmatrix} \quad (10)$$

As described above, the calibration apparatus 50 calculates the roll angle φ, the pitch angle ψ, and the yaw angle θ of the vehicle 1.

Figure 4:
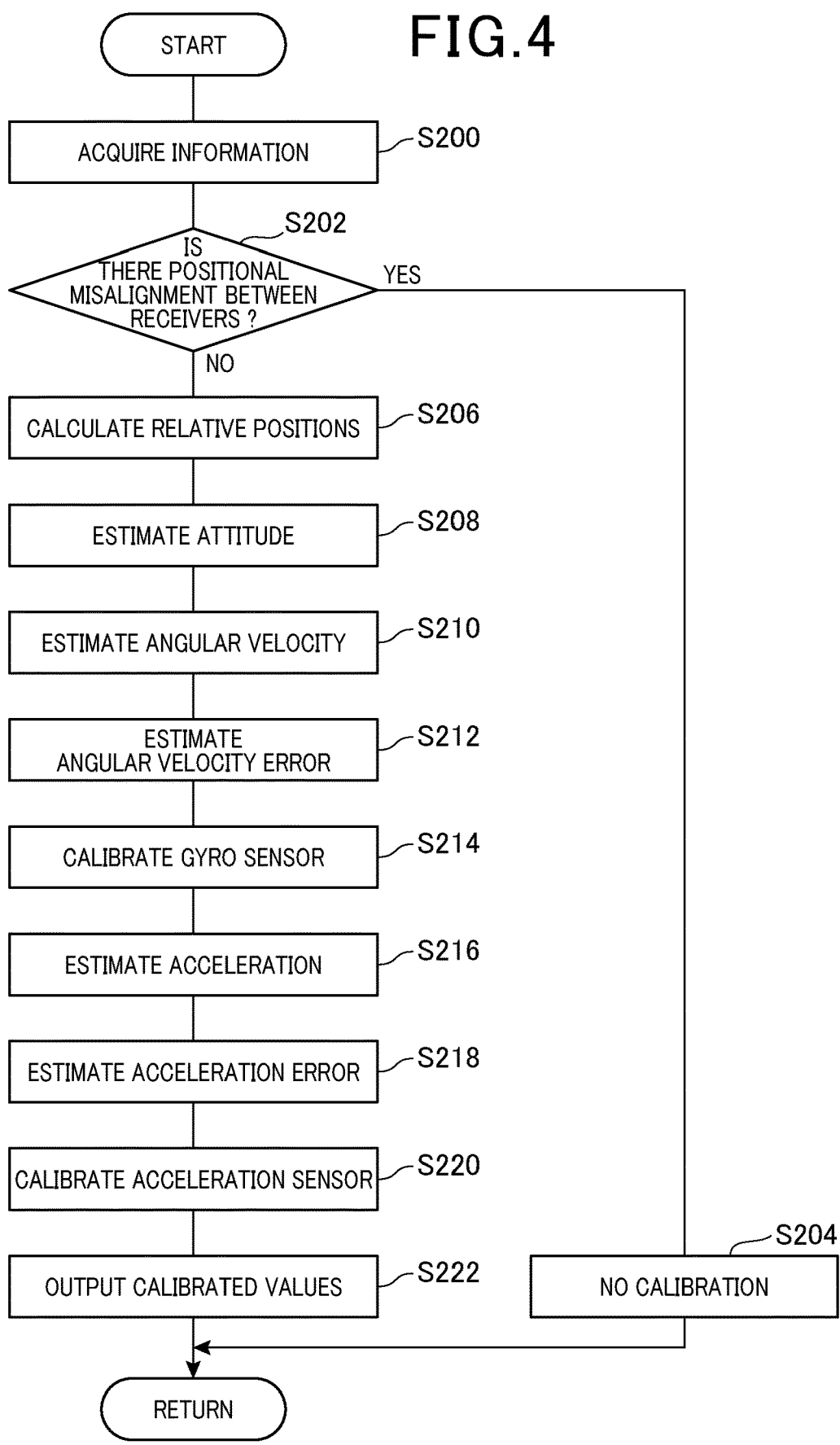
FIG. 4 is a flowchart of an inertial sensor calibration process performed by the calibration apparatus.

Next, how the calibration apparatus 50 calibrates the gyro sensor 20 and the acceleration sensor 40 by executing a calibration program will be described with reference to the flowchart of FIG. 4. For example, this calibration program is executed when the ignition of the vehicle 1 is turned on. In the following, a period of a series of operations from the start of step S200 to the return to step S200 is defined as a control cycle of the calibration process performed by the calibration apparatus 50.

At step S200, the calibration apparatus 50 acquires various information.

Specifically, the calibration apparatus 50 reads, from the RAM, the determination as to whether there is a positional misalignment between the reference GNSS receiver 10 and the first GNSS receiver 11 or the second GNSS receiver 12 made by executing the above-described positional misalignment detection program. In addition, the calibration apparatus 50 acquires the reference data Dref from the reference GNSS receiver 10. The calibration apparatus 50 acquires the first data D1 from the first GNSS receiver 11. The calibration apparatus 50 acquires the second data D2 from the second GNSS receiver 12. The calibration apparatus 50 further acquires the detected angular velocity $\Omega c$ of the vehicle 1 from the gyro sensor 20. The calibration apparatus 50 acquires the detected acceleration Ac of the vehicle 1 from the acceleration sensor 40.

Then, at step S202, the calibration apparatus 50 uses the determination acquired at step S200 to determine whether there is a positional misalignment between the reference GNSS receiver 10 and the first GNSS receiver 11 or the second GNSS receiver 12. The calibration apparatus 50 thereby determines whether to calibrate the gyro sensor 20 and the acceleration sensor 40.

If there is a positional misalignment between the reference GNSS receiver 10 and the first GNSS receiver 11 or the second GNSS receiver 12, the process flow proceeds to step S204. If there is no positional misalignment between the reference GNSS receiver 10, the first GNSS receiver 11, and the second GNSS receiver 12, the process flow proceeds to step S206.

At step S204 subsequent to step S202, there is a positional misalignment between the reference GNSS receiver 10 and the first GNSS receiver 11 or the second GNSS receiver 12. In such cases where there is a positional misalignment between the reference GNSS receiver 10 and the first GNSS receiver 11 or the second GNSS receiver 12, as will be described below, the accuracy of values for the gyro sensor 20 and the acceleration sensor 40 calibrated by the calibration apparatus 50 is reduced as compared to cases where there is no positional misalignment between the reference GNSS receiver 10, the first GNSS receiver 11, and the second GNSS receiver 12.

Therefore, for example, the calibration apparatus 50 does not calibrate the gyro sensor 20 and the acceleration sensor 40 and transmits a signal indicating that the gyro sensor 20 and the acceleration sensor 40 are not to be calibrated to a notification device (not shown). This notification device notifies the driver of the vehicle 1 of the gyro sensor 20 and the acceleration sensor 40 being not to be calibrated, for example by means of sound and light. The process flow then returns to step S200.

At step S206 subsequent to step S202, there is no positional misalignment between the reference GNSS receiver 10, the first GNSS receiver 11, and the second GNSS receiver 12. In such cases where there is no positional misalignment between the reference GNSS receiver 10, the first GNSS receiver 11, and the second GNSS receiver 12, the accuracy of values for the gyro sensor 20 and the acceleration sensor 40 calibrated by the calibration apparatus 50 is higher than in cases where there is a positional misalignment between the reference GNSS receiver 10 and the first GNSS receiver 11 or the second GNSS receiver 12.

Therefore, the calibration apparatus 50 calibrates the gyro sensor 20 and the acceleration sensor 40. To this end, the calibration apparatus 50 calculates the first relative position vector P1 and the second relative position vector P2 in the same manner as at step S102 above.

Then, at step S208, the calibration apparatus 50 estimates, in the same manner as at step S104 above, the attitude quantity q and the change in attitude quantity $\Delta q$ of the vehicle 1 based on the first relative position vector P1 and the second relative position vector P2 calculated at step S206. Step S206 is performed by the relative position calculator 51 that corresponds to a position calculator. Step S208 is performed by the attitude estimator 52.

Then, at step S210, the calibration apparatus 50 calculates the estimated angular velocity $\Omega e$ of the vehicle 1 based on the attitude quantity q and the change in attitude quantity $\Delta q$ estimated at step S208. Step S210 is performed by the angular velocity estimator 55.

For example, the calibration apparatus 50 substitutes the attitude quantity q and the change in attitude quantity $\Delta q$ estimated at step S208 into the following relational expression (11). The calibration apparatus 50 thereby calculates the estimated angular velocity $\Omega e$ of the vehicle 1. In the relational expression (11), $\omega e\varphi$ is an angular velocity about the X-axis, of the estimated angular velocity $\Omega e$, in the vehicle coordinate system $\Sigma$. $\omega e\psi$ is an angular velocity about the Y-axis, of the estimated angular velocity $\Omega e$, in the vehicle coordinate system $\Sigma$. $\omega e\theta$ is an angular velocity about the Z-axis, of the estimated angular velocity $\Omega e$, in the vehicle coordinate system $\Sigma$. The superscript 'T' is the matrix transpose operator. The superscript '−1' is the matrix inverse operator. t is an integer equal to or greater than 0 and represents the number of updates. q0(t) is q0 of the components of the attitude quantity q updated for the $t^{th}$ time. q1(t) is q1 of the components of the attitude quantity q updated for the $t^{th}$ time. q2(t) is q2 of the components of the attitude quantity q updated for the $t^{th}$ time. q3(t) is q3 of the components of the attitude quantity q updated for the $t^{th}$ time.

$$\Omega e = (G^T \times G)^{-1} \times G^T \times \Delta q \qquad (11)$$

$$\Omega e = \begin{bmatrix} \omega e\varphi \\ \omega e\psi \\ \omega e\theta \end{bmatrix} \quad q = \begin{bmatrix} q0 \\ q1 \\ q2 \\ q3 \end{bmatrix} \quad \Delta q = \begin{bmatrix} \Delta q0 \\ \Delta q1 \\ \Delta q2 \\ \Delta q3 \end{bmatrix} = \begin{bmatrix} q0(t) - q0(t-1) \\ q1(t) - q1(t-1) \\ q2(t) - q2(t-1) \\ q3(c) - q3(t-1) \end{bmatrix}$$

$$G = 0.5 \times \begin{bmatrix} -q1 & -q2 & -q3 \\ q0 & q3 & q2 \\ q3 & q0 & q1 \\ q2 & q1 & q0 \end{bmatrix}$$

At step S212, the calibration apparatus 50 estimates the angular velocity error $\varepsilon\Omega$ based on the estimated angular velocity $\Omega e$ calculated at step S210 and the detected angular velocity $\Omega c$ acquired from the gyro sensor 20 at step S200. Details of estimation of the angular velocity error $\varepsilon\Omega$ will be described later. Step S212 is performed by the angular velocity error estimator 56 that corresponds to an error estimator.

At step S214, based on the angular velocity error εΩ estimated at step S212, the calibration apparatus 50 calibrates the detected angular velocity Ωc acquired from the gyro sensor 20 at step S200. Details of calibration of the detected angular velocity Ωc will be described later. Step S214 is performed by the gyro calibrator 57 that corresponds to a calibrator.

At step S216, the calibration apparatus 50 calculates an estimated acceleration Ae of the vehicle 1 based on the attitude quantity q estimated at step S208. Step S216 is performed by the acceleration estimator 58.

Specifically, since the acceleration sensor 40 is subjected to gravity, the calibration apparatus 50 substitutes q0, q1, q2, and q3 of the attitude quantity q estimated at step S208 into the following relational expression (12). The calibration apparatus 50 thereby estimates the estimated acceleration Ae of the vehicle 1. In the relational expression (12), aex is an X-directional component of the estimated acceleration Ae of the vehicle 1 in the vehicle coordinate system Σ. aey is a Y-directional component of the estimated acceleration Ae of the vehicle 1 in the vehicle coordinate system Σ. aez is a Z-directional component of the estimated acceleration Ae of the vehicle 1 in the vehicle coordinate system Σ. g represents the gravitational acceleration. The superscript "−1" means the conjugate quaternion.

$$Ae = \begin{bmatrix} aex \\ aey \\ aez \end{bmatrix} = q^{-1} \times \begin{bmatrix} 0 \\ 0 \\ g \end{bmatrix} \times q = Q \times \begin{bmatrix} 0 \\ 0 \\ g \end{bmatrix} \quad (12)$$

$$q^{-1} = q0 - q1 \times i - q2 \times j - q3 \times k$$

$$Q = \begin{bmatrix} q0^2 + q1^2 - q2^2 - q3^2 & 2 \times (q1 \times q2 + q0 \times q3) & 2 \times (q2 \times q3 - q0 \times q2) \\ 2 \times (q1 \times q2 - q0 \times q3) & q0^2 - q1^2 + q2^2 - q3^2 & 2 \times (q2 \times q3 + q0 \times q1) \\ 2 \times (q1 \times q3 + q0 \times q2) & 2 \times (q2 \times q3 - q0 \times q1) & q0^2 - q1^2 - q2^2 + q3^2 \end{bmatrix}$$

At step S218, the calibration apparatus 50 estimates the acceleration error εA based on the estimated acceleration Ae calculated at step S216 and the detected acceleration Ac acquired from the acceleration sensor 40 at step S200, estimated. Details of estimation of the acceleration error εA will be described later. Step S218 is performed by the acceleration error estimator 59 that corresponds to an error estimator.

At step S220, the calibration apparatus 50 calibrates the detected acceleration Ac acquired from the acceleration sensor 40 at step S200 based on the acceleration error εA estimated at step S218. Details of calibration of the detected acceleration Ac will be described later. Step S220 is performed by the acceleration calibrator 60 that corresponds to the calibrator.

At step S222, the calibration apparatus 50 outputs the calibrated angular velocity Ωc_cal calculated at step S214 and the calibrated acceleration Ac_cal calculated at step S220 to the outside. Thereafter, the process flow returns to step S200.

Next, how the calibration apparatus 50 estimates the angular velocity error εΩ at step S212 will be described.

The following terms are defined herein to describe estimation of the angular velocity error εΩ.

The angular velocity about the X-axis in the vehicle coordinate system Σ, of the angular velocity Ωc detected by the gyro sensor 20, is referred to as a detected roll rate ωcφ. The angular velocity about the Y axis in the vehicle coordinate system Σ, of the angular velocity Ωc detected by the gyro sensor 20, is referred to as a detected pitch rate ωcψ. The angular velocity about the Z-axis in the vehicle coordinate system Σ, of the detected angular velocity Ωc by the gyro sensor 20, is referred to as a detected yaw rate ωcθ. Each of the detected roll rate ωcφ, the detected pitch rate ωcψ, and the detected yaw rate ωcθ is detected in, for example, rad/s, where rad means radians.

The amount by which the detected roll rate ωcφ changes when the angular velocity about the X-axis in the vehicle coordinate system Σ of the vehicle 1, that is, the roll rate of the vehicle 1, changes by a unit amount, is the roll rate sensitivity εφφ. The amount by which the detected pitch rate ωcψ changes when the angular velocity about the Y-axis in the vehicle coordinate system Σ of the vehicle 1, that is, the pitch rate of vehicle 1, changes by a unit amount, is the pitch rate sensitivity εψψ. The amount by which the detected yaw rate ωcθ changes when the angular velocity about the Z-axis in the vehicle coordinate system Σ of the vehicle 1, that is, the yaw rate of the vehicle 1, changes by a unit amount, is the yaw rate sensitivity εθθ. The unit for each of the roll rate sensitivity εφφ, the pitch rate sensitivity εψψ, and the yaw rate sensitivity εθθ is dimensionless.

The amount by which the detected roll rate ωcφ changes when the angular velocity about the Y-axis in the vehicle coordinate system Σ of the vehicle 1, that is, the pitch rate of the vehicle 1, changes by a unit amount, is the pitch-roll cross-axis sensitivity εψφ. The amount by which the detected roll rate ωcφ changes when the angular velocity about the Z-axis in the vehicle coordinate system Σ of the vehicle 1, that is, the yaw rate of the vehicle 1, changes by a unit amount, is the yaw-roll cross-axis sensitivity εeφ. The amount by which the detected pitch rate ωcψ changes when the angular velocity about the X-axis in the vehicle coordinate system Σ of the vehicle 1, that is, the roll rate of the vehicle 1, changes by a unit amount, is the roll-pitch cross-axis sensitivity εφψ. The amount by which the detected pitch rate ωcψ changes when the angular velocity about the Z-axis in the vehicle coordinate system Σ of the vehicle 1, that is, the yaw rate of the vehicle 1, changes by a unit amount, is the yaw-pitch cross-axis sensitivity εθψ. The amount by which the detected yaw rate ωcθ changes when the angular velocity about the X-axis in the vehicle coordinate system Σ of the vehicle 1, that is, the roll rate of the vehicle 1, changes by a unit amount, is the roll-yaw cross-axis sensitivity εφθ. The amount by which the detected yaw rate ωcθ changes when the angular velocity about the Y-axis in the vehicle coordinate system Σ of the vehicle 1, that is, the pitch rate of the vehicle 1, changes by a unit amount, is the pitch-yaw cross-axis sensitivity εψθ. The unit for each of the pitch-roll cross-axis sensitivity εψφ, the yaw-roll cross-axis sensitivity εθφ, the roll-pitch cross-axis sensitivity εφψ, the yaw-pitch cross-axis sensitivity εθψ, the roll-yaw cross-axis sensitivity εφθ, the pitch-yaw cross-axis sensitivity εψθ is dimensionless The detected roll rate ωcφ when the angular velocity about the X-axis in the vehicle coordinate system Σ of the vehicle 1, that is, the roll rate of the vehicle 1 is zero, is referred to as a roll rate zero error εφ0. the detected pitch rate ωcψ when the angular velocity about the Y axis in the vehicle coordinate system Σ of vehicle 1, that is, the pitch rate of vehicle 1, is zero is referred to as a pitch rate zero error εψ0. The detected yaw rate ωcθ when the angular velocity about the Z axis in the vehicle coordinate system Σ of the vehicle 1, that is, the yaw rate of the vehicle 1 is zero, is referred to as a yaw rate zero error $\varepsilon\theta0$. The unit for each of the roll rate zero error $\varepsilon\varphi0$, the pitch rate zero error $\varepsilon\psi0$, and the yaw rate zero error $\varepsilon\theta0$ is, for example, rad/sec, where rad means radians.

The angular velocity error $\varepsilon\Omega$ is represented by a 12-dimensional number vector, as shown in the following relation (13). Components of this angular velocity error $\varepsilon\Omega$ include the roll rate sensitivity $\varepsilon\varphi\varphi$, the pitch rate sensitivity $\varepsilon\psi\psi$, and the yaw rate sensitivity $\varepsilon\theta\theta$. The components of the angular velocity error $\varepsilon\Omega$ further include the roll-pitch cross-axis sensitivity $\varepsilon\varphi\psi$, the roll-yaw cross-axis sensitivity $\varepsilon\varphi\theta$, the pitch-roll cross-axis sensitivity $\varepsilon\psi\varphi$, the pitch-yaw cross-axis sensitivity $\varepsilon\psi\theta$, the yaw-roll cross-axis sensitivity $\varepsilon\theta\varphi$, and the yaw-pitch cross-axis sensitivity $\varepsilon\theta\psi$. The components of the angular velocity error $\varepsilon\Omega$ further include the roll rate zero error $\varepsilon\varphi0$, the pitch rate zero error $\varepsilon\psi0$, and the yaw rate zero error $\varepsilon\theta0$. In the relational expression (13), the superscript 'T' is the matrix transpose operator.

$$\varepsilon\Omega = [\varepsilon\varphi\varphi\,\varepsilon\psi\psi\,\varepsilon\theta\theta\,\varepsilon\psi\varphi\,\varepsilon\theta\varphi\,\varepsilon\varphi\psi\,\varepsilon\theta\psi\,\varepsilon\varphi\theta\,\varepsilon\psi\theta\,\varepsilon\varphi0\,\varepsilon\psi0\,\varepsilon\theta0]^T \quad (13)$$

Then, the calibration apparatus 50 estimates the angular velocity error $\varepsilon\Omega$ using, for example, a Kalman filter.

Specifically, the calibration apparatus 50 uses a state equation in which the angular velocity error $\varepsilon\Omega$ is a state vector, as shown in the following relation (14-1) below. The calibration apparatus 50 uses an observation equation in which the detected angular velocity $\Omega c$ detected by the gyro sensor 20 is an observation vector, as shown in relational expression (14-2) below. It is assumed that there is no noise in the following state equation and observation equation. t is an integer equal to or greater than 0 and represents the number of updates. $\varepsilon\Omega(t)$ is the angular velocity error $\varepsilon\Omega$ during the $t^{th}$ update. C is a state transition matrix from $\varepsilon\Omega(t)$ to $\varepsilon\Omega(t+1)$. This state transition matrix for angular velocity C is a 12×12 identity matrix, for example, as shown in relational expression (14-3) below. M(t) is an observation matrix that converts $\varepsilon\Omega(t)$ to $\Omega c(t)$. Furthermore, this observation matrix for angular velocity M is the matrix represented by $\omega e\varphi$, $\omega e\psi$, and $\omega e\theta$ estimated at step S210, as shown in the following relation (14-4) below. As described above, $\omega e\varphi$ is the angular velocity about the X-axis in the vehicle coordinate system $\Sigma$, of the estimated angular velocity $\Omega e$. $\omega e\psi$ is the angular velocity about the Y-axis in the vehicle coordinate system $\Sigma$, of the estimated angular velocity $\Omega e$. $\omega e\theta$ is the angular velocity about the Z-axis in the vehicle coordinate system $\Sigma$, of the estimated angular velocity $\Omega e$.

$$\varepsilon\Omega(t+1) = C \times \varepsilon\Omega(t) \quad (14\text{-}1)$$

$$\Omega c(t) = M(t) \times \varepsilon\Omega(t) \quad (14\text{-}2)$$

$$C = \begin{bmatrix} 1 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 \\ 0 & 0 & 0 & 1 & 0 & 0 & 0 & 0 & 0 & 0 & 0 & 0 \\ 0 & 0 & 0 & 0 & 1 & 0 & 0 & 0 & 0 & 0 & 0 & 0 \\ 0 & 0 & 0 & 0 & 0 & 1 & 0 & 0 & 0 & 0 & 0 & 0 \\ 0 & 0 & 0 & 0 & 0 & 0 & 1 & 0 & 0 & 0 & 0 & 0 \\ 0 & 0 & 0 & 0 & 0 & 0 & 0 & 1 & 0 & 0 & 0 & 0 \\ 0 & 0 & 0 & 0 & 0 & 0 & 0 & 0 & 1 & 0 & 0 & 0 \\ 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 1 \end{bmatrix} \quad (14\text{-}3)$$

$$M(t) = \begin{bmatrix} \omega e\varphi & 0 & 0 & \omega e\psi & \omega e\theta & 0 & 0 & 0 & 0 & 1 & 0 & 0 \\ 0 & \omega e\psi & 0 & 0 & 0 & \omega e\varphi & \omega e\theta & 0 & 0 & 0 & 1 & 0 \\ 0 & 0 & \omega e\theta & 0 & 0 & 0 & 0 & \omega e\varphi & \omega e\psi & 0 & 0 & 1 \end{bmatrix} \quad (14\text{-}4)$$

The calibration apparatus 50 estimates the angular velocity error $\varepsilon\Omega$ using, for example, the relational expressions (15-1) to (15-5). In the following relational expressions, $G\omega(t)$ is the Kalman gain during the $t^{th}$ update. $P\omega$ is the error covariance matrix of the angular velocity error $\varepsilon\Omega$, and $P\omega(t|t-1)$ is the priori error covariance matrix that is a predicted value of the error covariance matrix for angular velocity $P\omega$ during the $t^{th}$ update based on the information of up to the $(t-1)^{th}$ update. $P\omega(t|t)$ is the error covariance matrix for angular velocity $P\omega$ based on the information of up to the $t^{th}$ update. $\varepsilon\Omega(t|t-1)$ is the priori estimate that is a predicted value of the angular velocity error $\varepsilon\Omega$ based on the information of up to the $(t-1)^{th}$ update. $\varepsilon\Omega(t|t)$ is the posteriori estimate that is the optimal estimate of the angular velocity error $\varepsilon\Omega$ based on the information of up to the $t^{th}$ update. I is the identity matrix. The superscript 'T' is the matrix transpose operator. The superscript '-1' is the matrix inverse operator.

$$P\omega(t|t-1) = C \times P\omega(t-1|t-1) \times C^T \quad (15\text{-}1)$$

$$\varepsilon\Omega(t|t-1) = C \times \varepsilon\Omega(t-1|t-1) \quad (15\text{-}2)$$

$$G\omega(t) = P\omega(t|t-1) \times M(t)^T \times \{M(t) \times P\omega(t|t-1) \times M(t)^T\}^{-1} \quad (15\text{-}3)$$

$$\varepsilon\Omega(t|t) = \varepsilon\Omega(t|t-1) + G\omega(t) \times \{\Omega c(t) - M(t) \times \varepsilon\Omega(t|t-1)\} \quad (15\text{-}4)$$

$$P\omega(t|t) = \{I - G\omega(t) \times M(t)\} \times P\omega(t|t-1) \quad (15\text{-}5)$$

Specifically, in the case of the $t^{th}$ update, at step S212, the calibration apparatus 50 substitutes the state transition matrix for angular velocity C, the error covariance matrix for angular velocity $P\omega$ in the previous control cycle, and the transposed matrix of the state transition matrix for angular velocity C into the above relational expression (15-1). The calibration apparatus 50 thereby calculates $P\omega(t|t-1)$. $P\omega(t|t-1)$ is the predicted value of the error covariance matrix for the angular velocity $P\omega$ in the current control cycle. Since the state transition matrix for angular velocity C is the identity matrix, $P\omega(t|t-1)$ is the same as the error covariance matrix for angular velocity $P\omega$ in the previous control cycle. Furthermore, the initial value of the error covariance matrix for angular velocity $P\omega$ is set, for example, by experiment, simulation, or the like.

The calibration apparatus 50 also substitutes the state transition matrix for angular velocity C and the angular velocity error $\varepsilon\Omega$ in the previous control cycle into the above relational expression (15-2). The calibration apparatus 50 thereby calculates $\varepsilon\Omega(t|t-1)$. $\varepsilon\Omega(t|t-1)$ is a predicted value of the angular velocity error $\varepsilon\Omega$ in the current control cycle. Since the state transition matrix for angular velocity C is the identity matrix here, $\varepsilon\Omega(t|t-1)$ is the same as the angular velocity error $\varepsilon\Omega$ in the previous control cycle. Furthermore, the initial value of the angular velocity error $\varepsilon\Omega$ is set, for example, by experiment, simulation, or the like.

The calibration apparatus 50 substitutes $\omega e\varphi$, $\omega e\psi$, and $\omega e\theta$ estimated at step S210 in the current control cycle into the above relational expression (14-4). The calibration apparatus 50 thereby calculates the observation matrix for angular velocity M(t) in the current control cycle. As described above, $\omega e\varphi$ is the angular velocity about the X-axis in the vehicle coordinate system, of the estimated angular velocity $\Omega e$. $\omega e\psi$ is the angular velocity about the Y-axis in the vehicle coordinate system Σ, of the estimated angular velocity Ωe. ωeθ is the angular velocity about the Z-axis in the vehicle coordinate system Σ, of the estimated angular velocity Ωe.

The calibration apparatus 50 substitutes the above-calculated Pω(t|t−1), the above-calculated observation matrix for angular velocity M(t), and the transposed matrix of this observation matrix for angular velocity M(t) into the above-mentioned relational expression (15-3). The calibration apparatus 50 thereby calculates the Kalman gain for angular velocity Gω(t) in the current control cycle.

The calibration apparatus 50 generates an observation vector for angular velocity in the current control cycle from each component of the detected angular velocity Ωc acquired from the gyro sensor 20 at step S200. As described above, the components of the detected angular velocity Ωc acquired from the gyro sensor 20 are the detected roll rate ωcφ, the detected pitch rate ωcψ, and the detected yaw rate ωcθ. The detected roll rate ωcφ is an angular velocity about the X-axis in the vehicle coordinate system Σ, of the detected angular velocity Ωc. The detected pitch rate ωcψ is an angular velocity about the Y-axis in the vehicle coordinate system Σ, of the detected angular velocity Ωc. The detected yaw rate ωcθ is an angular velocity about the Z-axis in the vehicle coordinate system Σ, of the detected angular velocity Ωc.

The calibration apparatus 50 substitutes the above calculated εΩ(t|t−1), the above calculated Kalman gain for angular velocity Gω(t), the above generated observation vector for angular velocity, and the above calculated observation matrix for angular velocity M(t) into the relational expression (15-4). The calibration apparatus 50 thereby calculates the angular velocity error εΩ(t|t) in the current control cycle.

The calibration apparatus 50 substitutes the identity matrix I, the above calculated Kalman gain for angular velocity Gω(t), the above calculated observation matrix for angular velocity M(t), and the above calculated Pω(t|t−1) into (15-5). The calibration apparatus 50 thereby calculates the error covariance matrix for angular velocity Pω(t|t) in the current control cycle. Therefore, in the next control cycle, the calibration apparatus 50 can calculate Pω(t+1|t) using the calculated error covariance matrix for angular velocity Pω(t|t) in the current control cycle. Pω(t+1|t) is a predicted value of the error covariance matrix for angular velocity Pω in the next control cycle.

In this way, the calibration apparatus 50 estimates the angular velocity error εΩ.

Next, how the calibration apparatus 50 calibrates the gyro sensor 20 at step S214 will be described.

In the case of the $t^{th}$ update, the calibration apparatus 50 substitutes each component of the angular velocity error εΩ estimated at step S212 and each component of the detected angular velocity Ωc acquired from the gyro sensor 20 at step S200 into the following relational expression (16). The calibration apparatus 50 thereby calculates the calibrated angular velocity Ωc_cal. As described above, the calibrated angular velocity Ωc_cal is the detected angular velocity Ωc calibrated by the calibration apparatus 50. In the relational expression (16), ωcφ_cal is an angular velocity component about the X-axis in the vehicle coordinate system Σ, of the calibrated angular velocity Ωc_cal. ωcψ_cal is an angular velocity component about the Y-axis in the vehicle coordinate system Σ, of the calibrated angular velocity Ωc_cal. ωcθ_cal is an angular velocity component about the Z-axis in the vehicle coordinate system Σ, of the calibrated angular velocity Ωc_cal. The superscript 'T' is the matrix transpose operator. The superscript '−1' is the matrix inverse operator.

$$\Omega c\_cal = \begin{bmatrix} \omega c\varphi\_cal \\ \omega c\psi\_cal \\ \omega c\theta\_cal \end{bmatrix} = \begin{bmatrix} \varepsilon\varphi\varphi & \varepsilon\psi\varphi & \varepsilon\theta\varphi \\ \varepsilon\varphi\psi & \varepsilon\psi\psi & \varepsilon\theta\psi \\ \varepsilon\varphi\theta & \varepsilon\psi\theta & \varepsilon\theta\theta \end{bmatrix}^{-1} \times \begin{bmatrix} \omega c\varphi - \varepsilon\varphi 0 \\ \omega c\psi - \varepsilon\psi 0 \\ \omega c\theta - \varepsilon\theta 0 \end{bmatrix} \quad (16)$$

In this way, the calibration apparatus 50 calibrates the gyro sensor 20.

Next, how the calibration apparatus 50 estimates the acceleration error εA at step S218 will be described.

To describe how to estimate the acceleration error εA, some terms are defined as follows.

The X-axis directional component of the detected acceleration Ac detected by the acceleration sensor 40, in the vehicle coordinate system Σ, is referred to as an X-directional acceleration acx. The Y-axis directional component of the detected acceleration Ac detected by the acceleration sensor 40, in the vehicle coordinate system Σ, is referred to as a Y-directional acceleration acy. The Z-axis directional component of the detected acceleration Ac detected by the acceleration sensor 40, in the vehicle coordinate system Σ, is referred to as a Z-directional acceleration acz.

The amount by which the X-directional acceleration acx changes when the X-directional acceleration in the vehicle coordinate system Σ of vehicle 1 changes by a unit amount is the X-directional acceleration sensitivity εxx. The amount by which the Y-directional acceleration acy changes when the Y-directional acceleration in the vehicle coordinate system Σ of vehicle 1 changes by a unit amount is the Y-directional acceleration sensitivity εyy. The amount by which the Z-directional acceleration acz changes when the Z-directional acceleration in the vehicle coordinate system Σ of vehicle 1 changes by a unit amount is the Z-directional acceleration sensitivity εzz.

The amount by which the X-directional acceleration acx changes when the Y-axis directional acceleration in the vehicle coordinate system Σ of the vehicle 1 changes by a unit amount is referred to as the YX cross-axis sensitivity εyx. The amount by which the X-directional acceleration acx changes when the Z-axis directional acceleration in the vehicle coordinate system Σ of the vehicle 1 changes by a unit amount is referred to as the ZX cross-axis sensitivity εzx. The amount by which the Y-directional acceleration acy changes when the X-axis directional acceleration in the vehicle coordinate system Σ of the vehicle 1 changes by a unit amount is referred to as the XY cross-axis sensitivity εxy. The amount by which the Y-directional acceleration acy changes when the Z-axis directional acceleration in the vehicle coordinate system Σ of the vehicle 1 changes by a unit amount is referred to as the ZY cross-axis sensitivity εzy. The amount by which the Z-directional acceleration acz changes when the X-axis directional acceleration in the vehicle coordinate system Σ of the vehicle 1 changes by a unit amount is referred to as the XZ cross-axis sensitivity εxz. The amount by which the Z-directional acceleration acz changes when the Y-axis directional acceleration in the vehicle coordinate system Σ of the vehicle 1 changes by a unit amount is referred to as the YZ cross-axis sensitivity εyz. The X-directional acceleration sensitivity εxx, the Y-directional acceleration sensitivity εyy, and the Z-directional acceleration sensitivity εzz are dimensionless. The YX cross-axis sensitivity εyx, the ZX cross-axis sensitivity εzx, the XY cross-axis sensitivity εxy, the ZY cross-axis sensitivity εzy, the XZ cross-axis sensitivity εxz, the YZ cross-axis sensitivity εyz are dimensionless.

The X-directional acceleration acx when the X-axis directional component of the acceleration of the vehicle 1 in the vehicle coordinate system Σ is zero is referred to as an X-directional zero error εx0. The Y-directional acceleration acy when the Y-axis directional component of the acceleration of the vehicle 1 in the vehicle coordinate system Σ is zero is referred to as a Y-directional zero error εy0. The Z-directional acceleration acz when the Z-axis directional component of the acceleration of the vehicle 1 in the vehicle coordinate system Σ is zero is referred to as a Z-directional zero error εz0.

The acceleration error εA is represented by a 12-dimensional number vector, as shown in the following relational expression (17). In the relational expression (17), The superscript 'T' is the matrix transpose operator.

$$\varepsilon A = [\varepsilon xx \varepsilon yy \varepsilon zz \varepsilon yx \varepsilon zx \varepsilon xy \varepsilon zy \varepsilon xz \varepsilon yz \varepsilon x0 \ \varepsilon y0 \ \varepsilon z0]^T \quad (17)$$

The calibration apparatus 50 estimates the acceleration error εA using, for example, a Kalman filter.

Specifically, the calibration apparatus 50 uses a state equation in which the acceleration error εA is a state vector, as shown in the following relational expression (18-1). The calibration apparatus 50 uses an observation equation in which the detected acceleration Ac detected by the acceleration sensor 40 is an observation vector, as shown in the following relational expression (18-2). In the state equation and the observation equation below, it is assumed that there is no noise. t is an integer equal to or greater than 0 and represents the number of updates. εA(t) is the acceleration error εA during the $t^{th}$ update. D is a state transition matrix from εA(t) to εA(t+1). This state transition matrix for acceleration D is a 12×12 identity matrix, for example, as shown in the following relational expression (18-3). Furthermore, this observation matrix for acceleration N is a matrix represented by aex, aey, aez of the estimated acceleration Ae calculated at step S216, as shown in the following relational expression (18-4). As described above, aex is the X-directional component of the estimated acceleration Ae in the vehicle coordinate system Σ. aey is the Y-directional component of the estimated acceleration Ae in the vehicle coordinate system Σ. aez is the Z-directional component of the estimated acceleration Ae in the vehicle coordinate system Σ.

$$\varepsilon A(t+1) = D \times \varepsilon A(t) \quad (18\text{-}1)$$

$$Ac(t) = N(t) \times \varepsilon A(t) \quad (18\text{-}2)$$

$$D = \begin{bmatrix} 1 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 \\ 0 & 0 & 0 & 1 & 0 & 0 & 0 & 0 & 0 & 0 & 0 & 0 \\ 0 & 0 & 0 & 0 & 1 & 0 & 0 & 0 & 0 & 0 & 0 & 0 \\ 0 & 0 & 0 & 0 & 0 & 1 & 0 & 0 & 0 & 0 & 0 & 0 \\ 0 & 0 & 0 & 0 & 0 & 0 & 1 & 0 & 0 & 0 & 0 & 0 \\ 0 & 0 & 0 & 0 & 0 & 0 & 0 & 1 & 0 & 0 & 0 & 0 \\ 0 & 0 & 0 & 0 & 0 & 0 & 0 & 0 & 1 & 0 & 0 & 0 \\ 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 1 \end{bmatrix} \quad (18\text{-}3)$$

$$N(t) = \begin{bmatrix} aex & 0 & 0 & aey & aez & 0 & 0 & 0 & 0 & 1 & 0 & 0 \\ 0 & aey & 0 & 0 & 0 & aex & aez & 0 & 0 & 0 & 1 & 0 \\ 0 & 0 & aez & 0 & 0 & 0 & 0 & aex & aey & 0 & 0 & 1 \end{bmatrix} \quad (18\text{-}4)$$

In addition, the calibration apparatus 50 estimates the acceleration error εA using, for example, the following relational expressions (19-1) to (19-5). In the following relational expressions, Ga(t) is the Kalman gain during the $t^{th}$ update. Pa is an error covariance matrix of the acceleration error εA. Pa(t|t−1) is a priori error covariance matrix that is a predicted value of the error covariance matrix for acceleration Pa during the $t^{th}$ update based on information of up to the $(t−1)^{th}$ update. Pa(t|t) is the error covariance matrix for acceleration Pa based on the information of up to the $t^{th}$ update. εA(t|t−1) is a priori estimate that is a predicted value of the acceleration error εA during the $t^{th}$ update based on information of up to the $(t−1)^{th}$ update. εA(t|t) is a posteriori estimate that is the optimal estimate of the acceleration error εA based on information of up to the $t^{th}$ update. I is the identity matrix. The superscript 'T' is the matrix transpose operator. The superscript '−1' is the matrix inverse operator.

$$Pa(t|t-1) = D \times Pa(t-1|t-1) \times D^T \quad (19\text{-}1)$$

$$\varepsilon A(t|t-1) = D \times \varepsilon A(t-1|t-1) \quad (19\text{-}2)$$

$$Ga(t) = Pa(t|t-1) \times N(t)^T \times \{N(t) \times Pa(t|t-1) \times N(t)^T\}^{-1} \quad (19\text{-}3)$$

$$\varepsilon A(t|t) = \varepsilon A(t|t-1) + Ga(t) \times \{Ac(t) - N(t) \times \varepsilon A(t|t-1)\} \quad (19\text{-}4)$$

$$Pa(t|t) = \{I - Ga(t) \times N(t)\} \times Pa(t|t-1) \quad (19\text{-}5)$$

Specifically, in the case of the $t^{th}$ update, at step S220, the calibration apparatus 50 substitutes the state transition matrix for acceleration D, the error covariance matrix for acceleration Pa in the previous control cycle, and the transposed matrix of the state transition matrix for acceleration D into the above relational expression (19-1). The calibration apparatus 50 thereby calculates Pa(t|t−1). Pa(t|t−1) is the predicted value of the error covariance matrix for acceleration Pa in the current control cycle. Since the state transition matrix for acceleration D is the identity matrix, Pa(t|t−1) is the same as the error covariance matrix for acceleration Pa(t−1|t−1) in the previous control cycle. In addition, the initial value of the error covariance matrix for acceleration Pa is set, for example, by experiment, simulation, or the like.

In addition, the calibration apparatus 50 substitutes the state transition matrix for acceleration D and the acceleration error εA in the previous control cycle into the above-mentioned relational expression (19-2). The calibration apparatus 50 thereby calculates εA(t|t−1). εA(t|t−1) is a predicted value of the acceleration error εA in the current control cycle. Since the state transition matrix for acceleration D is the identity matrix here, εA(t|t−1) is the same as the acceleration error εA(t−1|t−1) in the previous control cycle. The initial value of the acceleration error εA is set, for example, by experiment, simulation, or the like.

The calibration apparatus 50 substitutes aex, aey, and aez estimated at step S216 in the current control cycle into the above-mentioned relational expression (18-4). The calibration apparatus 50 thereby calculates the observation matrix for acceleration N(t) in the current control cycle. As described above, aex is the X-directional component of the estimated acceleration Ae in the vehicle coordinate system Σ. aey is the Y-directional component of the estimated acceleration Ae in the vehicle coordinate system Σ. aez is the Z directional component of the estimated acceleration Ae in the vehicle coordinate system Σ.

The calibration apparatus 50 substitutes the above-calculated Pa(t|t−1), the above-calculated observation matrix for acceleration N(t), and the transposed matrix of this observation matrix for acceleration N(t) into the above-mentioned relational expression (19-3). The calibration apparatus 50 thereby calculates the Kalman gain for acceleration Ga(t) in the current control cycle.

The calibration apparatus 50 generates the observation vector for acceleration in the current control cycle from components of the detected acceleration Ac acquired from the acceleration sensor 40 at step S200. The components of the detected acceleration Ac acquired from the acceleration sensor 40 are the X-directional acceleration acx, the Y-directional acceleration acy, and the Z-directional acceleration acz. As described above, the X-directional acceleration acx is the X-axis directional component of the detected acceleration Ac in the vehicle coordinate system Σ. The Y-directional acceleration acy is the Y-axis directional component of the detected acceleration Ac in the vehicle coordinate system Σ. The Z-directional acceleration acz is the Z-axis directional component of the detected acceleration Ac in the vehicle coordinate system Σ.

In addition, the calibration apparatus 50 substitutes the εA(t|t−1) calculated above, the Kalman gain for acceleration Ga(t) calculated above, the observation vector for acceleration generated above, and the observation matrix for acceleration N(t) calculated above into the relational expression (19-4). The calibration apparatus 50 thereby calculates the acceleration error εA(t|t) in the current control cycle.

The calibration apparatus 50 substitutes the identity matrix I, the Kalman gain for acceleration Ga(t) calculated above, the observation matrix for acceleration N(t) calculated above, and Pa(t|t−1) calculated above into (19-5). The calibration apparatus 50 thereby calculates the error covariance matrix for acceleration Pa(t|t) in the current control cycle. Therefore, in the next control cycle, the calibration apparatus 50 can calculate Pa(t+1|t) using the calculated error covariance matrix for acceleration Pa(t|t) in the current control cycle. Pa(t+1|t) is a predicted value of the error covariance matrix for acceleration Pa in the next control cycle.

In this way, the calibration apparatus 50 estimates the acceleration error εA.

Next, how the calibration apparatus 50 calibrates the acceleration sensor 40 at step S220 will be described.

In the case of the $t^{th}$ update, the calibration apparatus 50 substitutes each component of the acceleration error εA estimated at step S218 and each component of the detected acceleration Ac acquired from the acceleration sensor 40 at step S200 into the following relational expression (20). The calibration apparatus 50 thereby calculates the calibrated acceleration Ac_cal. The calibrated acceleration Ac_cal is the detected acceleration Ac calibrated by the calibration apparatus 50. In the relational expression (20), acx_cal is an X-axis directional component of the calibrated acceleration Ac_cal in the vehicle coordinate system Σ. acy_cal is a Y-axis directional component of the calibrated acceleration Ac_cal in the vehicle coordinate system Σ. acz_cal is a Z-axis directional component of the calibrated acceleration Ac_cal in the vehicle coordinate system Σ. The superscript '−1' is the matrix inverse operator.

$$Ac\_cal = \begin{bmatrix} acx\_cal \\ acy\_cal \\ acz\_cal \end{bmatrix} = \begin{bmatrix} \varepsilon xx & \varepsilon yx & \varepsilon zx \\ \varepsilon xy & \varepsilon yy & \varepsilon zy \\ \varepsilon xz & \varepsilon yz & \varepsilon zz \end{bmatrix}^{-1} \times \begin{bmatrix} acx - \varepsilon x0 \\ acy - \varepsilon y0 \\ acz - \varepsilon z0 \end{bmatrix} \quad (20)$$

In this way, the calibration apparatus 50 calibrates the acceleration sensor 40.

As described above, the calibration apparatus 50 calibrates the gyro sensor 20 and the acceleration sensor 40.

It will now be described that it is possible for the calibration apparatus 50 to calibrate the gyro sensor 20 and the acceleration sensor 40, whether the vehicle 1 is stopped or traveling.

The calibration apparatus 50, at step S206, estimates the attitude quantity q and the change in attitude quantity Δq of the vehicle 1 based on the first relative position vector P1 and the second relative position vector P2.

As described above, the first relative position vector P1 is a vector representing a relative position of the first GNSS receiver 11 to a position of the reference GNSS receiver 10 in the absolute coordinate system Σo. The second relative position vector P2 is a vector representing a relative position of the second GNSS receiver 12 to the position of the reference GNSS receiver 10 in the absolute coordinate system Σo. The reference GNSS receiver 10, the first GNSS receiver 11, and the second GNSS receiver 12 are disposed in the vehicle 1. Therefore, the first relative position vector P1 and the second relative position vector P2 do not vary, whether the vehicle 1 is stopped or traveling. Therefore, whether the vehicle 1 is stopped or traveling, the calibration apparatus 50 can estimate the attitude quantity q and the change in attitude quantity Δq of the vehicle 1.

In addition, the calibration apparatus 50 estimates, at step S210, the estimated angular velocity Ωe based on the attitude quantity q and the change in attitude quantity Δq. The calibration apparatus 50 further estimates, at step S212, the angular velocity error εΩ of the vehicle 1 based on this estimated angular velocity Ωe and the detected angular velocity Ωc detected by the gyro sensor 20. The calibration apparatus 50 calibrates the detected angular velocity Ωc detected by the gyro sensor 20 based on this angular velocity error εΩ at step S214. Therefore, the calibration apparatus 50 can calibrate the gyro sensor 20 whether the vehicle 1 is stopped or traveling.

Further, the calibration apparatus 50 estimates, at step S216, the estimated acceleration Ae based on this attitude quantity q. The calibration apparatus 50, at step S218, estimates the acceleration error εA of the vehicle 1 based on the estimated acceleration Ae and the detected acceleration Ac detected by the acceleration sensor 40. The calibration apparatus 50 calibrates, at step S220, the detected acceleration Ac detected by the acceleration sensor 40 based on this acceleration error εA. Therefore, the calibration apparatus 50 can calibrate the acceleration sensor 40 whether the vehicle 1 is stopped or traveling.

The calibration apparatus 50 can also provide the following advantages.

As described above, the calibration apparatus 50 estimates the attitude quantity q and the change in attitude quantity Δq of the vehicle 1 based on the first relative position vector P1 and the second relative position vector P2.

In cases where there is a positional misalignment between the reference GNSS receiver 10 and the first GNSS receiver 11 or the second GNSS receiver 12, values of the first relative position vector P1 and the second relative position vector P2 may change. This reduces the accuracy of the attitude quantity q and the change in attitude quantity Δq of the vehicle 1 and thus reduces the accuracy of the values for the gyro sensor 20 and the acceleration sensor 40 calibrated by the calibration apparatus 50.

Thus, the calibration apparatus 50 determines whether there is a positional misalignment between the reference GNSS receiver 10 and the first GNSS receiver 11 or the second GNSS receiver 12.

More specifically, the calibration apparatus 50 calculates, at step S106, the yaw angle θ of the vehicle 1 based on the attitude quantity q. Further, the calibration apparatus 50 calculates, at step S110, the reference receiver velocity Vref, the first receiver velocity V1, and the second receiver velocity V2 based on the reference data Dref, the first data D1, and the second data D2. The calibration apparatus 50 also calculates the estimated yaw angle θe of the vehicle 1 based on the reference receiver velocity Vref, the first receiver velocity V1, and the second receiver velocity V2 at step S112. As described above, the reference data Dref is data transmitted from the reference GNSS receiver 10 to the calibration apparatus 50, and includes the wavenumber and the phase of the carrier wave and the ephemeris from each positioning satellite with respect to time. The first data D1 is data transmitted from the first GNSS receiver 11 to the calibration apparatus 50, and includes the wavenumber and the phase of the carrier wave and the ephemeris from each positioning satellite with respect to time. The second data D2 is data transmitted from the second GNSS receiver 12 to the calibration apparatus 50, and includes the wavenumber and the phase of the carrier wave and the ephemeris from each positioning satellite with respect to time. The ephemeris is orbital information of the positioning satellite. The reference receiver velocity Vref is a velocity vector of the reference GNSS receiver 10 in the absolute coordinate system Σo. The first receiver velocity V1 is a velocity vector of the first GNSS receiver 11 in the absolute coordinate system Σo. The second receiver velocity V2 is a velocity vector of the second GNSS receiver 12 in the absolute coordinate system Σo.

The calibration apparatus 50, at step S114, determines, based on the above-calculated yaw angle θ and the estimated yaw angle θe, whether there is a positional misalignment between the reference GNSS receiver 10 and the first GNSS receiver 11 or the second GNSS receiver 12. This determination is stored, for example, in RAM of the calibration apparatus 50. The calibration apparatus 50, at step S202, also reads from the RAM the determination as to whether there is a positional misalignment between the reference GNSS receiver 10 and the first GNSS receiver 11 or the second GNSS receiver 12.

In cases where there is no positional misalignment between the reference GNSS receiver 10, the first GNSS receiver 11, and the second GNSS receiver 12, the accuracy of the attitude quantity q and the change in attitude quantity Δq of the vehicle 1 is improved. Therefore, in such cases, the calibration apparatus 50 calibrates the gyro sensor 20 and the acceleration sensor 40. This improves the accuracy of calibration of the gyro sensor 20 and the acceleration sensor 40 by the calibration apparatus 50.

The calibration apparatus 50, at step S108, determines whether the vehicle speed Vc is equal to or higher than the vehicle speed threshold Vc_th. In cases where the vehicle speed Vc is equal to or higher than the vehicle speed threshold Vc_th, the calibration apparatus 50 calculates the reference receiver velocity Vref, the first receiver velocity V1, and the second receiver velocity V2 at step S110. Where, the reference receiver velocity Vref, the first receiver velocity V1 and the second receiver velocity V2 are higher as compared to cases where the vehicle speed Vc is lower than the vehicle speed threshold Vc_th. This stabilizes values of the reference receiver velocity Vref, the first receiver velocity V1, and the second receiver velocity V2, which improves the accuracy of calculation of the reference receiver velocity Vref, the first receiver velocity V1, and the second receiver velocity V2. Therefore, the accuracy of calculation of the estimated yaw angle θe at step S112 is improved.

Modification

Figure 5:
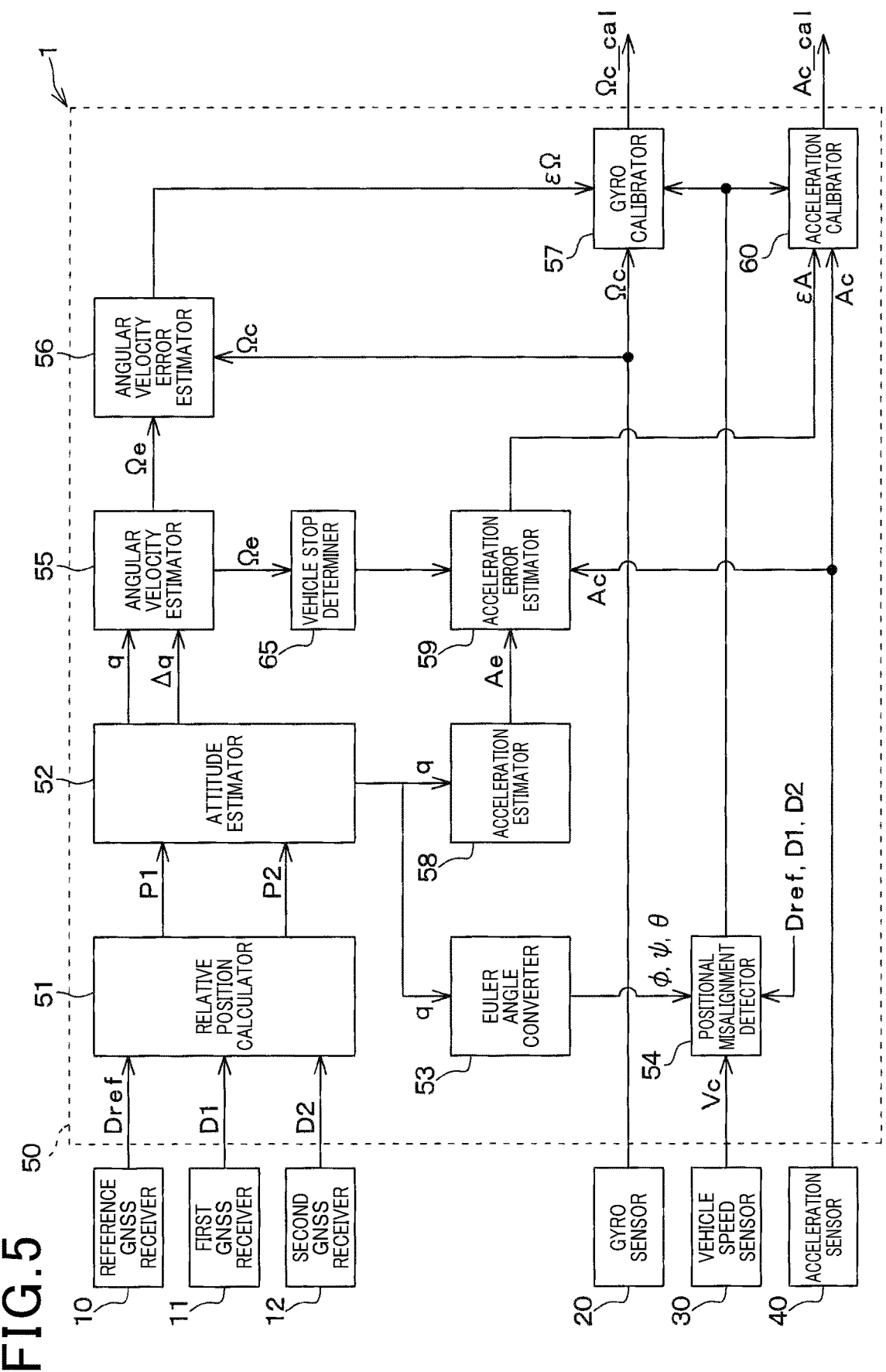
FIG. 5 is a block diagram of a calibration apparatus according to one modification.

In one modification, the calibration apparatus 50 differs in process steps from in the above-described embodiment. More specifically, the calibration apparatus 50 further includes a vehicle stop determiner 65 as a functional block, as illustrated in FIG. 5.

The vehicle stop determiner 65 determines whether the vehicle 1 is stopped, based on the estimated angular velocity Ωe calculated by the angular velocity estimator 55 described above. The vehicle stop determiner 65 is responsible for execution of step S300 described later.

When the vehicle 1 is stopped, the acceleration error estimator 59 estimates the acceleration error εA of the vehicle 1 based on the estimated acceleration Ae calculated by the acceleration estimator 58 and the detected acceleration Ac detected by the acceleration sensor 40. The acceleration error estimator 59 does not estimate the acceleration error εA of the vehicle 1 when the vehicle 1 is not stopped.

Figure 6:
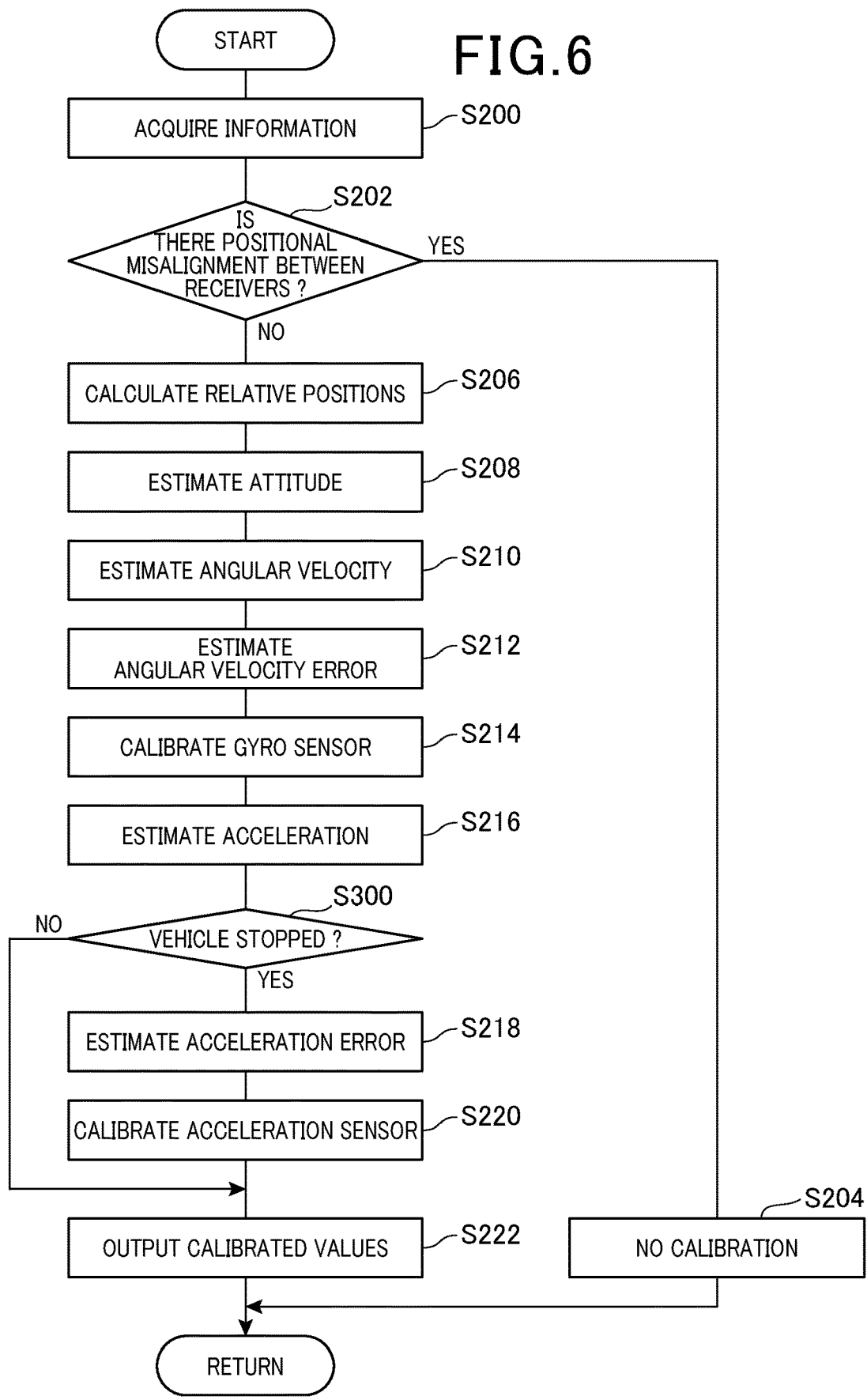
FIG. 6 is a flowchart of an inertial sensor calibration process performed by the calibration apparatus according to the modification.

Calibration of the gyro sensor 20 and the acceleration sensor 40 performed by the calibration apparatus 50 executing the program according to the modification will now be described with reference to the flowchart of FIG. 6.

The process steps from step S200 to step S216 are the same as above.

At step S300 subsequent to step S216, the calibration apparatus 50 determines whether the vehicle 1 is stopped, based on the estimated angular velocity Ωe calculated at step S210. Step S300 is performed by the vehicle stop determiner 65.

More specifically, the calibration apparatus 50 determines whether ωeφ of the estimated angular velocity Ωe is less than a first threshold we_th1, ωeψ of the estimated angular velocity Ωe is less than a second threshold ωe_th2, and ωeθ of the estimated angular velocity Ωe is less than a third threshold ωe_th3. As described above, ωeφ is the angular velocity about the X-axis, of the estimated angular velocity Ωe, in the vehicle coordinate system Σ. ωeψ is the angular velocity about the Y-axis, of the estimated angular velocity Ωe, in the vehicle coordinate system Σ. ωeθ is the angular velocity about the Z-axis, of the estimated angular velocity Ωe, in the vehicle coordinate system Σ. The first threshold ωe_th1, the second threshold ωe_th2, and the third threshold ωe_th3 are set by experiment, simulation, or the like.

If ωeφ is less than the first threshold ωe_th1, ωeψ is less than the second threshold ωe_th2, and ωeθ is less than the third threshold ωe_th3, then the calibration apparatus 50 determines that the vehicle 1 is stopped as the angular velocity of the vehicle 1 is relatively small. Thereafter, the process flow proceeds to step S218. If ωeφ is equal to or greater than the first threshold ωe_th1, or ωeψ is equal to or greater than the second threshold ωe_th2, or ωeθ is equal to or greater than the third threshold ωe_th3, then the calibration apparatus 50 determines that the vehicle 1 is not stopped as the vehicle 1 is moving. Thereafter, the process flow proceeds to step S222.

At step S218 subsequent to step S300, the calibration apparatus 50 estimates the acceleration error εA based on the estimated acceleration Ae calculated at step S216 and the detected acceleration Ac acquired from the acceleration sensor 40 at step S200. Since the vehicle 1 is stopped, only gravity is likely to be applied to the vehicle 1. This reduces noise detected by the acceleration sensor 40, thus improving the accuracy of calculation of the acceleration error εA by the calibration apparatus 50.

Then, at step S220, the calibration apparatus 50 calibrates, in the same manner as described above, the detected acceleration Ac acquired from the acceleration sensor 40 at step S200 based on the acceleration error εA estimated at step S218.

At step S222, if at step S300 the calibration apparatus 50 determines that the vehicle 1 is stopped, the calibration apparatus 50 outputs the calibrated angular velocity Ωc_cal calculated at step S214 and the calibrated acceleration Ac_cal calculated at step S220 to the outside. If at step S300 the calibration apparatus 50 determines that the vehicle 1 is not stopped, the calibration apparatus 50 outputs only the calibrated angular velocity Ωc_cal calculated at step S214 to the outside as the detected acceleration Ac is uncalibrated. Thereafter, the process flow returns to step S200.

As described above, the calibration apparatus 50 according to the modification calibrates the gyro sensor 20 and the acceleration sensor 40.

The modification described above can also provide the same advantages as the above embodiment. In the modification, the calibration apparatus 50 estimates the acceleration error εA when the vehicle 1 is stopped. Therefore, as described above, noise detected by the acceleration sensor 40 is reduced, which can improve the accuracy of calculation of the acceleration error εA by the calibration apparatus 50.

The calibration apparatus 50 determines whether the vehicle 1 is stopped, based on the estimated angular velocity Ωe calculated at step S210. This allows the calibration apparatus 50 to determine whether the vehicle 1 is stopped without depending on the vehicle speed Vc detected by the vehicle speed sensor 30.

Other Embodiments

The present disclosure should not be limited to the embodiments described above and can be modified as deemed appropriate. The above-described embodiments are not independent from one another, and some of them can be combined as deemed appropriate unless such a combination is unreasonable. Needless to say, in the above-described embodiments, the components of the embodiments should not be necessarily deemed to be essential unless explicitly described or they are fundamentally and obviously essential, for example.

In the above-described embodiments and modifications, the calculator, the estimator, the calibrator, and the determiner and their methods described in the present disclosure may be implemented by a dedicated computer including a processor and a memory programmed to execute one or more functions embodied by computer programs. Alternatively, the calculator, the estimator, the calibrator, and the determiner and their methods described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible computer-readable storage medium.

In the above-described embodiments, the vehicle 1 is provided with one reference GNSS receiver 10, one first GNSS receiver 11, and one second GNSS receiver 12. In an alternative embodiment, the number of reference GNSS receivers 10 is not limited to one, but may be two or more. For example, when the number of reference GNSS receivers 10 is two, the first relative position vector P1 is calculated based on the reference data Dref from one of the two reference GNSS receivers 10 and the first data D1 from the first GNSS receiver 11. The second relative position vector P2 may be calculated based on the reference data Dref from the other of the two reference GNSS receivers 10 and the second data D2 from the second GNSS receiver 12.

The number of the first GNSS receivers 11 may be two or more, not limited to one. Further, the number of the second GNSS receivers 12 may be two or more, not limited to one.

The vehicle 1 may be provided with a third GNSS receiver (not shown) different from any one of the first GNSS receiver 11 and the second GNSS receiver 12. In such an alternative embodiment, the first relative position vector P1 may be calculated based on the reference data Dref from the reference GNSS receiver 10 and data from the third GNSS receiver. The second relative position vector P2 may be calculated based on the reference data Dref from the reference GNSS receiver 10 and data from the third GNSS receiver.

In the above-described embodiments, the calibration apparatus 50 uses a wavenumber and a phase of the contemporaneous carrier wave in each of the reference data Dref and the first data D1 to calculate the first relative position vector P1 using the Moving Baseline RTK method. The calibration apparatus 50 uses a wavenumber and a phase of the contemporaneous carrier wave in each of the data for reference Dref and the second data D2 to calculate the second relative position vector P2 using the Moving Baseline RTK method.

In an alternative embodiment, the reference GNSS receiver 10 may calculate an absolute position of the reference GNSS receiver 10 based on signals from a plurality of positioning satellites (not shown). The reference GNSS receiver 10 may also transmit data of this calculated absolute position of the reference GNSS receiver 10 to the calibration apparatus 50. Further, the first GNSS receiver 11 may calculate an absolute position of the first GNSS receiver 11 based on signals from the plurality of positioning satellites (not shown). The first GNSS receiver 11 may also transmit data of this calculated absolute position of the first GNSS receiver 11 to the calibration apparatus 50. Further, the second GNSS receiver 12 may calculate an absolute position of the second GNSS receiver 12 based on signals from the plurality of positioning satellites (not shown). The second GNSS receiver 12 may also transmit data of this calculated absolute position of the second GNSS receiver 12 to the calibration apparatus 50.

In such an alternative embodiment, the Xo-axis directional component of the absolute position of the reference GNSS receiver 10 in the absolute coordinate system Σo is denoted by x_ref. The Yo-axis directional component of the absolute position of the reference GNSS receiver 10 in the absolute coordinate system Σo is denoted by y_ref. The Zo-axis directional component of the absolute position of the reference GNSS receiver 10 in the absolute coordinate system Σo is denoted by z_ref. The Xo-axis directional component of the absolute position of the first GNSS receiver 11 in the absolute coordinate system Σo is denoted by x1. The Yo-axis directional component of the absolute position of the first GNSS receiver 11 in the absolute coordinate system Σo is denoted by y1. The Zo-axis directional component of the absolute position of the first GNSS receiver 11 in the absolute coordinate system Σo is denoted by z1. The Xo-axis directional component of the absolute position of the second GNSS receiver 12 in the absolute coordinate system Σo is denoted by x2. The Yo-axis directional component of the absolute position of the second GNSS receiver 12 in the absolute coordinate system Σo is denoted by y2. The Zo-axis directional component of the absolute position of the second GNSS receiver 12 in the absolute coordinate system Σo is denoted by z2.

Then, the calibration apparatus 50 may calculate the first relative position vector P1 based on the absolute position of the reference GNSS receiver 10 and the absolute position of the first GNSS receiver 11. The calibration apparatus 50 may also calculate the second relative position vector P2 based on the absolute position of the reference GNSS receiver 10 and the absolute position of the second GNSS receiver 12.

More specifically, as shown in the following relational expression (21), the calibration apparatus 50 calculates x1_rel by subtracting x_ref from x1. The calibration apparatus 50 calculates the y1_rel by subtracting the y_ref from the y1. The calibration apparatus 50 calculates z1_rel by subtracting z_ref from z1. the calibration apparatus 50 calculates x2_rel by subtracting x_ref from x2. The calibration apparatus 50 calculates y2_rel by subtracting y_ref from y2. The calibration apparatus 50 calculates z2_rel by subtracting z_ref from z2. As described above, x1_rel is the Xo-axis directional component of the first relative position vector P1 in the absolute coordinate system Σo. y1_rel is the Yo-axis directional component of the first relative position vector P1 in the absolute coordinate system Σo. z1_rel is the Zo-axis directional component of the first relative position vector P1 in the absolute coordinate system Σo. x2_rel is the Xo-axis directional component of the second relative position vector P2 in the absolute coordinate system Σo. y2_rel is the Yo-axis directional component of the second relative position vector P2 in the absolute coordinate system Σo. z2_rel is the Zo-axis directional component of the second relative position vector P2 in the absolute coordinate system Σo.

$$\begin{bmatrix} x1\_rel \\ y1\_rel \\ z1\_rel \\ x2\_rel \\ y2\_rel \\ z2\_rel \end{bmatrix} = \begin{bmatrix} x1 - x\_ref \\ y1 - y\_ref \\ z1 - z\_ref \\ x2 - x\_ref \\ y2 - y\_ref \\ z2 - z\_ref \end{bmatrix} \quad (21)$$

In this manner, the calibration apparatus 50 may calculate the first relative position vector P1 and the second relative position vector P2.

In the above-described embodiments, the calibration apparatus 50, at step S112, calculates the estimated yaw angle θe based on the reference receiver velocity Vref, the first receiver velocity V1, and the second receiver velocity V2 calculated at step S110. In an alternative embodiment, the calibration apparatus 50 may calculate the estimated yaw angle θe based on one or more of the reference receiver velocity Vref, the first receiver velocity V1, and the second receiver velocity V2 calculated at step S110.

In the above-described embodiments, the calibration apparatus 50, at step S114, calculates the absolute value of a difference between the yaw angle θ calculated at step S106 and the estimated yaw angle θe calculated at step S112, |θ−θe|. The calibration apparatus 50 determines whether the calculated absolute value |θ−θe| is greater than the displacement threshold Δθ_th. The calibration apparatus 50 thereby detects the positional misalignment between the reference GNSS receiver 10 and the first GNSS receiver 11 or the second GNSS receiver 12. In an alternative embodiment, the calibration apparatus 50 is not limited in configuration to calculating the above absolute value |θ−θe|.

For example, the calibration apparatus 50 may divide the yaw angle θ calculated at step S106 by the estimated yaw angle θe calculated at step S112. The calibration apparatus 50 may detect a positional misalignment between the reference GNSS receiver 10 and the first GNSS receiver 11 or the second GNSS receiver 12 by comparing this divided value with a threshold value. The threshold value for the divided value is set by experiment, simulation, or the like.

In the above-described embodiments, it is assumed that there is no noise in the state equation and the observation equation. In an alternative embodiment, noise may be taken into account in the state equation and the observation equation. For example, noise in the state equation and the observation equation for the attitude quantity q is an error in data received by each of the reference GNSS receiver 10, the first GNSS receiver 11, and the second GNSS receiver 12. Noise in the state equation and the observation equation for the angular velocity error εΩ is an error in each component caused by a temperature change of the gyro sensor 20. Further, noise in the state equation and the observation equation for the acceleration error εA is an error in each component caused by a temperature change of the acceleration sensor 40.

In the above-described embodiments, the calibration apparatus 50 estimates the angular velocity error εΩ of the vehicle 1 at step S212. In the above-described embodiments, this angular velocity error εΩ is any one of a value for a change in detected angular velocity Ωc detected by the gyro sensor 20 when the angular velocity of the vehicle 1 changes and a value for the detected angular velocity Ωc detected by the gyro sensor 20 when the vehicle 1 is stopped. In an alternative embodiment, the calibration apparatus 50 may estimate only the value for the change in detected angular velocity Ωc detected by the gyro sensor 20 when the angular velocity of the vehicle 1 changes. In another alternative embodiment, the calibration apparatus 50 may estimate only the value for the detected angular velocity Ωc detected by the gyro sensor 20 when the vehicle 1 is stopped.

In the above-described embodiments, the calibration apparatus 50 estimates the acceleration error εA of the vehicle 1 at step S218. In the above-described embodiments, this acceleration error εA is any one of a value for a change in detected acceleration Ac detected by the acceleration sensor 40 when the acceleration of the vehicle 1 changes and a value for the detected acceleration Ac detected by the acceleration sensor 40 when the vehicle 1 is stopped. In an alternative embodiment, the calibration apparatus 50 may estimate only the value for the change in detected acceleration Ac detected by the acceleration sensor 40 when the acceleration of the vehicle 1 changes. In another alternative embodiment, the calibration apparatus 50 may estimate only the value for the detected acceleration Ac detected by the acceleration sensor 40 when the vehicle 1 is stopped.

In the above-described embodiments, the position coordinates of the reference GNSS receiver 10 in the vehicle coordinate system Σ are represented by Ant_ref. The position coordinates of the first GNSS receiver 11 in the vehicle coordinate system Σ are represented by Ant1. The position coordinates of the second GNSS receiver 12 in the vehicle coordinate system Σ are represented by Ant2. Here, the X coordinate of Ant_ref in the vehicle coordinate system Σ is set to 1. The Y coordinate of Ant_ref in the vehicle coordinate system Σ is set to 0. The Z coordinate of Ant_ref in the vehicle coordinate system Σ is set to 0. The X coordinate of Ant1 in the vehicle coordinate system Σ is set to 0. The Y-coordinate of Ant1 in the vehicle coordinate system Σ is set to 1. The Z-coordinate of Ant1 in the vehicle coordinate system Σ is set to 0. The X-coordinate of Ant2 in the vehicle coordinate system Σ is set to 0. The Y-coordinate of Ant2 in the vehicle coordinate system Σ is set to −1. The Z-coordinate of Ant2 in the vehicle coordinate system Σ is set to 0.

The position coordinates of each of Ant_ref, Ant1, and Ant2 are not limited to the above values. In an alternative embodiment, the position coordinates of each of Ant_ref, Ant1, and Ant2 may be set according to the reference GNSS receiver 10, the first GNSS receiver 11, and the second GNSS receiver 12 arranged in the vehicle 1.

In the above-described embodiments, the calibration apparatus 50 estimates the attitude quantity q of the vehicle 1 using the extended Kalman filter. In an alternative embodiment, the calibration apparatus 50 is not limited in configuration to estimating the attitude quantity q of the vehicle 1 using the extended Kalman filter. For example, the calibration apparatus 50 may estimate the attitude quantity q of the vehicle 1 based on a direction of the first relative position vector P1 or a direction of the second relative position vector P2.

In the above-described embodiments, the calibration apparatus 50 estimates the angular velocity error $\varepsilon\Omega$ using the Kalman filter. The calibration apparatus 50 is not limited in configuration to using the Kalman filter to estimate the angular velocity error $\varepsilon\Omega$. For example, the calibration apparatus 50 may estimate the angular velocity error $\varepsilon\Omega$ based on a difference between the estimated angular velocity $\Omega e$ and the detected angular velocity $\Omega c$ detected by the gyro sensor 20.

In the above-described embodiments, the calibration apparatus 50 estimates the acceleration error $\varepsilon A$ using the Kalman filter. The calibration apparatus 50 is not limited in configuration to using the Kalman filter to estimate the acceleration error $\varepsilon A$. For example, the calibration apparatus 50 may estimate the acceleration error $\varepsilon A$ based on a difference between the estimated acceleration Ae and the detected acceleration Ac detected by the acceleration sensor 40.

In the above-described embodiments, the state transition matrix for attitude B, the state transition matrix for angular velocity C, and the state transition matrix for acceleration D are unit matrices. The state transition matrix for attitude B, the state transition matrix for angular velocity C, and the state transition matrix for acceleration D are not limited to unit matrices, and may be set to predetermined values by experiment, simulation, or the like.

In the above modification, at step S300, the calibration apparatus 50 determines, based on the estimated angular velocity $\Omega e$ calculated at step S210, whether the vehicle 1 is stopped. The calibration apparatus 50 is not limited in configuration to determining whether the vehicle 1 is stopped based on the estimated angular velocity $\Omega e$.

For example, the calibration apparatus 50 may determine whether the vehicle 1 is stopped, based on the vehicle speed Vc detected by the vehicle speed sensor 30. More specifically, the calibration apparatus 50 may determine that the vehicle 1 is stopped when the vehicle speed Vc is lower than a threshold value. The calibration apparatus 50 may determine that the vehicle 1 is not stopped when the vehicle speed Vc is equal to or higher than the threshold value. This threshold value for the vehicle speed Vc may be set by experiment, simulation, or the like.

What is claimed is:

1. An apparatus for calibrating an inertial sensor configured to detect an angular velocity of a vehicle, the vehicle being equipped with at least one reference receiver which receives signals from a plurality of positioning satellites, at least one first receiver which receives signals from the plurality of positioning satellites, and at least one second receiver which receives signals from the plurality of positioning satellites, the apparatus comprising:

a position calculator configured to calculate a first relative position of the first receiver to a position of the reference receiver based on data based on the signals received by the reference receiver from the positioning satellites and data based on the signals received by the first receiver from the positioning satellites, and calculate a second relative position of the second receiver to the position of the reference receiver based on the data based on the signals received by the reference receiver from the positioning satellites and data based on the signals received by the second receiver from the positioning satellites;

an attitude estimator configured to estimate a value for an attitude of the vehicle and a value for a change in attitude of the vehicle based on the first relative position and the second relative position;

an angular velocity estimator configured to estimate a value for an angular velocity of the vehicle based on the value for the attitude of the vehicle estimated by the attitude estimator and the value for the change in attitude of the vehicle estimated by the attitude estimator;

an error estimator configured to, based on the value for the angular velocity of the vehicle estimated by the angular velocity estimator and a value for the angular velocity of the vehicle detected by the inertial sensor, estimate a value for an angular velocity error that is an error between the value for the angular velocity of the vehicle estimated by the angular velocity estimator and the value for the angular velocity of the vehicle detected by the inertial sensor; and a calibrator configured to calibrate the value for the angular velocity of the vehicle detected by the inertial sensor based on the value for the angular velocity error estimated by the error estimator, wherein the first receiver is mounted to the vehicle and disposed to the left of and behind the reference receiver with a fixed distance between the first receiver and the reference receiver, the second receiver is mounted to the vehicle and disposed to the right of and behind the reference receiver with a fixed distance between the second receiver and the reference receiver, and the first receiver and the second receiver are mounted to the vehicle with a fixed distance between the first receiver and the second receiver, and the attitude estimator is configured to
calculate a predicted value for the attitude of the vehicle at a current time based on the values for the attitude of the vehicle before the current time,
estimate the value for the attitude of the vehicle at the current time based on the predicted value for the attitude of the vehicle calculated, the first relative position, and the second relative position, and
estimate the value for the change in attitude of the vehicle at the current time based on the values for the attitude of the vehicle before the current time and the estimated value for the attitude of the vehicle at the current time.

2. The apparatus according to claim 1, wherein the value for the angular velocity error includes values for a change in angular velocity of the vehicle detected by the inertial sensor when the angular velocity of the vehicle changes or values for the angular velocity of the vehicle detected by the inertial sensor when the vehicle is stopped, and the error estimator is configured to calculate the predicted value for the angular velocity error at the current time based on the values for the angular velocity error before the current time, and estimate the value for the angular velocity error at the current time based on the predicted value for the angular velocity error calculated, the value for the angular velocity of the vehicle estimated by the angular velocity estimator, and the value for the angular velocity of the vehicle detected by the inertial sensor.

3. The apparatus according to claim 1, wherein the attitude estimator is configured to estimate the value for the attitude of the vehicle based on the positions of the reference receiver, the first receiver, and the second receiver that are preset in the vehicle.

4. The apparatus according to claim 1, further comprising a positional misalignment determiner configured to determine whether there is a positional misalignment between the reference receiver and the first receiver or the second receiver, wherein the calibrator is configured to, in response to the positional misalignment determiner determining that there is no positional misalignment between the reference receiver, the first receiver, and the second receiver, calibrate the inertial sensor.

5. The apparatus according to claim 4, further comprising:
a converter configured to estimate a value for a yaw angle of the vehicle based on the value for the attitude of the vehicle estimated by the attitude estimator;
a speed calculator configured to calculate a speed of the reference receiver using the data based on the signals received by the reference receiver from the positioning satellites, a speed of the first receiver using the data based on the signals received by the first receiver from the positioning satellites, and a velocity of the second receiver using the data based on the signals received by the second receiver from the positioning satellites; and
a yaw angle estimator configured to estimate the value for the yaw angle of the vehicle based on the speed of the reference receiver, the speed of the first receiver, and the speed of the second receiver,
wherein the positional misalignment determiner is configured to determine whether there is a positional misalignment between the reference receiver and the first receiver or the second receiver, based on the value for the yaw angle of the vehicle estimated by the converter and the value for the yaw angle of the vehicle estimated by the yaw angle estimator.

6. The apparatus according to claim 4, further comprising:
a converter configured to estimate a value for a yaw angle of the vehicle based on the value for the attitude of the vehicle estimated by the attitude estimator;
a speed calculator configured to calculate at least one of a speed of the reference receiver using the data based on the signals received by the reference receiver from the positioning satellites, a speed of the first receiver using the data based on the signals received by the first receiver from the positioning satellites, and a velocity of the second receiver using the data based on the signals received by the second receiver from the positioning satellites; and
a yaw angle estimator configured to estimate the value for the yaw angle of the vehicle based on the calculated at least one of the speed of the reference receiver, the speed of the first receiver, and the speed of the second receiver, wherein the positional misalignment determiner is configured to determine whether there is a positional misalignment between the reference receiver and the first receiver or the second receiver, based on the value for the yaw angle of the vehicle estimated by the converter and the value for the yaw angle of the vehicle estimated by the yaw angle estimator.

7. The apparatus according to claim 4, further comprising a speed determiner configured to determine whether a speed of the vehicle is equal to or higher than a threshold value for the speed of the vehicle, wherein the positional misalignment determiner is configured to, in response to the speed determiner determining that the speed of the vehicle being equal to or higher than the threshold value for the speed of the vehicle, determine whether there is a positional misalignment between the reference receiver and the first receiver or the second receiver.

8. An apparatus for calibrating an inertial sensor configured to detect an acceleration of a vehicle, the vehicle being equipped with at least one reference receiver which receives signals from a plurality of positioning satellites, at least one first receiver which receives signals from the plurality of positioning satellites, and at least one second receiver which receives signals from the plurality of positioning satellites, the apparatus comprising:

a position calculator configured to calculate a first relative position of the first receiver to a position of the reference receiver based on data based on the signals received by the reference receiver from the positioning satellites and data based on the signals received by the first receiver from the positioning satellites, and calculate a second relative position of the second receiver to the position of the reference receiver based on the data based on the signals received by the reference receiver from the positioning satellites and data based on the signals received by the second receiver from the positioning satellites;

an attitude estimator configured to estimate a value for an attitude of the vehicle based on the first relative position and the second relative position;

an acceleration estimator configured to estimate a value for an acceleration of the vehicle based on the value for the attitude of the vehicle estimated by the attitude estimator;

an error estimator configured to, based on the value for the acceleration of the vehicle estimated by the acceleration estimator and a value for the acceleration of the vehicle detected by the inertial sensor, estimate a value for an acceleration error that is an error between the value for the acceleration of the vehicle estimated by the acceleration estimator and the value for the acceleration of the vehicle detected by the inertial sensor; and a calibrator configured to calibrate the value for the acceleration of the vehicle detected by the inertial sensor based on the value for the acceleration error estimated by the error estimator, wherein the first receiver is mounted to the vehicle and disposed to the left of and behind the reference receiver with a fixed distance between the first receiver and the reference receiver, the second receiver is mounted to the vehicle and disposed to the right of and behind the reference receiver with a fixed distance between the second receiver and the reference receiver, and the first receiver and the second receiver are mounted to the vehicle with a fixed distance between the first receiver and the second receiver, and the attitude estimator is configured to calculate a predicted value for the attitude of the vehicle at a current time based on the values for the attitude of the vehicle before the current time, and estimate the value for the attitude of the vehicle based on the predicted value for the attitude of the vehicle calculated, the first relative position, and the second relative position.

9. The apparatus according to claim 8, wherein the value for the acceleration error includes values for a change in acceleration of the vehicle detected by the inertial sensor when the acceleration of the vehicle changes or values for the acceleration of the vehicle detected by the inertial sensor when the vehicle is stopped, and the error estimator is configured to calculate the predicted value for the acceleration error at a current time based on the values for the acceleration error before the current time, and estimate the value for the acceleration error at the current time based on the predicted value for the acceleration error calculated, the value for the acceleration of the vehicle estimated by the acceleration estimator, and the value for the acceleration of the vehicle detected by the inertial sensor.

10. The apparatus according to claim 8, further comprising a vehicle stop determiner configured to determine whether the vehicle is stopped, wherein the calibrator is configured to calibrate the value for the acceleration of the vehicle detected by the inertial sensor when the vehicle is stopped.

11. The apparatus according to claim 10, wherein the attitude estimator is configured to estimate a value for a change in attitude of the vehicle at the current time based on the values for the attitude of the vehicle before the current time and the value for the attitude of the vehicle at the current time, the apparatus further comprises an angular velocity estimator configured to estimate values for the angular velocity of the vehicle based on the value for the attitude of the vehicle estimated by the attitude estimator and the value for the change in attitude of the vehicle estimated by the attitude estimator, and the vehicle stop determiner is configured to, in response to each of the values for the angular velocity of the vehicle estimated by the angular velocity estimator being less than a threshold value, determine that the vehicle is stopped, and in response to at least one of the values for the angular velocity of the vehicle estimated by the angular velocity estimator being equal to or greater than the threshold value, determine that the vehicle is not stopped.

12. The apparatus according to claim 8, wherein the attitude estimator is configured to estimate the value for the attitude of the vehicle based on the positions of the reference receiver, the first receiver, and the second receiver that are preset in the vehicle.

13. The apparatus according to claim 8, further comprising a positional misalignment determiner configured to determine whether there is a positional misalignment between the reference receiver and the first receiver or the second receiver, wherein the calibrator is configured to, in response to the positional misalignment determiner determining that there is no positional misalignment between the reference receiver, the first receiver, and the second receiver, calibrate the inertial sensor.

14. The apparatus according to claim 13, further comprising:

a converter configured to estimate a value for a yaw angle of the vehicle based on the value for the attitude of the vehicle estimated by the attitude estimator;

a speed calculator configured to calculate a speed of the reference receiver using the data based on the signals received by the reference receiver from the positioning satellites, a speed of the first receiver using the data based on the signals received by the first receiver from the positioning satellites, and a velocity of the second receiver using the data based on the signals received by the second receiver from the positioning satellites; and a yaw angle estimator configured to estimate the value for the yaw angle of the vehicle based on the speed of the reference receiver, the speed of the first receiver, and the speed of the second receiver, wherein the positional misalignment determiner is configured to determine whether there is a positional misalignment between the reference receiver and the first receiver or the second receiver, based on the value for the yaw angle of the vehicle estimated by the converter and the value for the yaw angle of the vehicle estimated by the yaw angle estimator.

15. The apparatus according to claim 13, further comprising:

a converter configured to estimate a value for a yaw angle of the vehicle based on the value for the attitude of the vehicle estimated by the attitude estimator;

a speed calculator configured to calculate at least one of a speed of the reference receiver using the data based on the signals received by the reference receiver from the positioning satellites, a speed of the first receiver using the data based on the signals received by the first receiver from the positioning satellites, and a velocity of the second receiver using the data based on the signals received by the second receiver from the positioning satellites; and a yaw angle estimator configured to estimate the value for the yaw angle of the vehicle based on the calculated at least one of the speed of the reference receiver, the speed of the first receiver, and the speed of the second receiver, wherein the positional misalignment determiner is configured to determine whether there is a positional misalignment between the reference receiver and the first receiver or the second receiver, based on the value for the yaw angle of the vehicle estimated by the converter and the value for the yaw angle of the vehicle estimated by the yaw angle estimator.

16. The apparatus according to claim 13, further comprising a speed determiner configured to determine whether a speed of the vehicle is equal to or higher than a threshold value for the speed of the vehicle, wherein the positional misalignment determiner is configured to, in response to the speed determiner determining that the speed of the vehicle being equal to or higher than the threshold value for the speed of the vehicle, determine whether there is a positional misalignment between the reference receiver and the first receiver or the second receiver.

17. A method for calibrating an inertial sensor configured to detect an angular velocity of a vehicle, the vehicle being equipped with at least one reference receiver which receives signals from a plurality of positioning satellites, at least one first receiver which receives signals from the plurality of positioning satellites, and at least one second receiver which receives signals from the plurality of positioning satellites, the method comprising:

calculating a first relative position of the first receiver to a position of the reference receiver based on data based on the signals received by the reference receiver from the positioning satellites and data based on the signals received by the first receiver from the positioning satellites, and calculating a second relative position of the second receiver to the position of the reference receiver based on the data based on the signals received by the reference receiver from the positioning satellites and data based on the signals received by the second receiver from the positioning satellites;

estimating a value for an attitude of the vehicle and a value for a change in attitude of the vehicle based on the first relative position and the second relative position;

estimating a value for an angular velocity of the vehicle based on the value for the attitude of the vehicle estimated and the value for the change in attitude of the vehicle estimated;

based on the value for the angular velocity of the vehicle estimated and a value for the angular velocity of the vehicle detected by the inertial sensor, estimating a value for an angular velocity error that is an error between the value for the angular velocity of the vehicle estimated and the value for the angular velocity of the vehicle detected by the inertial sensor; and calibrating the value for the angular velocity of the vehicle detected by the inertial sensor based on the value for the angular velocity error estimated by the error estimator, wherein the first receiver is mounted to the vehicle and disposed to the left of and behind the reference receiver with a fixed distance between the first receiver and the reference receiver, the second receiver is mounted to the vehicle and disposed to the right of and behind the reference receiver with a fixed distance between the second receiver and the reference receiver, and the first receiver and the second receiver are mounted to the vehicle with a fixed distance between the first receiver and the second receiver, and estimating the value for the attitude of the vehicle and the value for the change in attitude of the vehicle includes calculating a predicted value for the attitude of the vehicle at a current time based on the values for the attitude of the vehicle before the current time, estimating the value for the attitude of the vehicle at the current time based on the predicted value for the attitude of the vehicle calculated, the first relative position, and the second relative position, and estimating the value for the change in attitude of the vehicle at the current time based on the values for the attitude of the vehicle before the current time and the estimated value for the attitude of the vehicle at the current time.

18. A method for calibrating an inertial sensor configured to detect an acceleration of a vehicle, the vehicle being equipped with at least one reference receiver which receives signals from a plurality of positioning satellites, at least one first receiver which receives signals from the plurality of positioning satellites, and at least one second receiver which receives signals from the plurality of positioning satellites, the method comprising:

calculating a first relative position of the first receiver to a position of the reference receiver based on data based on the signals received by the reference receiver from the positioning satellites and data based on the signals received by the first receiver from the positioning satellites, and calculating a second relative position of the second receiver to the position of the reference receiver based on the data based on the signals received by the reference receiver from the positioning satellites and data based on the signals received by the second receiver from the positioning satellites;

estimating a value for an attitude of the vehicle based on the first relative position and the second relative position;

estimating a value for an acceleration of the vehicle based on the value for the attitude of the vehicle estimated;

based on the value for the acceleration of the vehicle estimated and a value for the acceleration of the vehicle detected by the inertial sensor, estimating a value for an acceleration error that is an error between the value for the acceleration of the vehicle estimated and the value for the acceleration of the vehicle detected by the inertial sensor; and calibrating the value for the acceleration of the vehicle detected by the inertial sensor based on the value for the acceleration error estimated, wherein the first receiver is mounted to the vehicle and disposed to the left of and behind the reference receiver with a fixed distance between the first receiver and the reference receiver, the second receiver is mounted to the vehicle and disposed to the right of and behind the reference receiver with a fixed distance between the second receiver and the reference receiver, and the first receiver and the second receiver are mounted to the vehicle with a fixed distance between the first receiver and the second receiver, and estimating the value for the attitude of the vehicle includes calculating a predicted value for the attitude of the vehicle at a current time based on the values for the attitude of the vehicle before the current time, and estimating the value for the attitude of the vehicle based on the predicted value for the attitude of the vehicle calculated, the first relative position, and the second relative position.

\* \* \* \* \*